US012574158B2

(12) United States Patent
Bang et al.

(10) Patent No.: US 12,574,158 B2
(45) Date of Patent: Mar. 10, 2026

(54) METHOD AND APPARATUS FOR FEEDING BACK HARQ-ACK IN WIRELESS COMMUNICATION SYSTEM

(71) Applicant: Samsung Electronics Co., Ltd., Suwon-si (KR)

(72) Inventors: Jonghyun Bang, Suwon-si (KR); Jinyoung Oh, Suwon-si (KR); Hyunseok Ryu, Suwon-si (KR); Sungjin Park, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 17/798,223

(22) PCT Filed: Feb. 10, 2021

(86) PCT No.: PCT/KR2021/001836
§ 371 (c)(1),
(2) Date: Aug. 8, 2022

(87) PCT Pub. No.: WO2021/162480
PCT Pub. Date: Aug. 19, 2021

(65) Prior Publication Data
US 2023/0118350 A1 Apr. 20, 2023

(30) Foreign Application Priority Data

Feb. 14, 2020 (KR) ........................ 10-2020-0018576
Apr. 8, 2020 (KR) ........................ 10-2020-0042982

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1607* (2013.01); *H04L 1/1854* (2013.01); *H04W 74/08* (2013.01)

(58) Field of Classification Search
CPC ... H04L 1/1812; H04L 1/1607; H04L 1/1854; H04W 74/08
See application file for complete search history.

(56) References Cited

U.S. PATENT DOCUMENTS 10,404,438 B2    9/2019   Park
10,560,981 B2    2/2020   Myung et al.
(Continued)

FOREIGN PATENT DOCUMENTS

CN       109314615 A      2/2019
CN       110547036 A      12/2019
(Continued)

OTHER PUBLICATIONS

International Search Report dated May 14, 2021, issued in International Application No. PCT/KR2021/001836.
(Continued)

*Primary Examiner* — Jasper Kwoh
(74) *Attorney, Agent, or Firm* — Jefferson IP Law, LLP

(57) ABSTRACT

Provided is a terminal for performing transmission and reception of data in a wireless communication system, wherein the terminal receives, from a base station, first configuration information for code block group (CBG)-based uplink transmission, and second configuration information including a downlink feedback information (DFI) bitmap configuration method, transmits a CBG-based uplink signal to the base station, based on the first configuration information, receives, from the base station, DFI including feedback information about the CBG-based uplink signal, based on the second configuration information, and deter- (Continued)

mines a contention window value of the terminal, based on the feedback information included in the received DFI, wherein the DFI bitmap configuration method indicates whether the feedback information is for feedback in units of transport blocks (TBs) or for feedback for one or more CBGs.

8 Claims, 11 Drawing Sheets

(51) Int. Cl.
　　*H04L 1/1829*　　　　(2023.01)
　　*H04W 74/08*　　　　(2024.01)

(56)　　　　　　References Cited

U.S. PATENT DOCUMENTS

| | | | |
|---|---|---|---|
| 10,721,031 | B2 | 7/2020 | Park et al. |
| 12,192,007 | B2 * | 1/2025 | Hedayat ............. H04W 74/002 |
| 2012/0034927 | A1 * | 2/2012 | Papasakellariou .... H04L 1/1861 455/450 |
| 2016/0065349 | A1 | 3/2016 | Papasakellariou et al. |
| 2020/0236587 | A1 | 7/2020 | Kim et al. |
| 2020/0344819 | A1 | 10/2020 | Myung et al. |
| 2021/0044392 | A1 | 2/2021 | Myung et al. |
| 2021/0297193 | A1 | 9/2021 | Noh et al. |
| 2022/0029754 | A1 | 1/2022 | Li |
| 2022/0159730 | A1 * | 5/2022 | Shin .......................... H04L 1/00 |
| 2022/0190993 | A1 * | 6/2022 | Shin ...................... H04W 72/12 |
| 2022/0232629 | A1 * | 7/2022 | Lin ..................... H04L 27/0006 |
| 2022/0240313 | A1 * | 7/2022 | Lin ....................... H04L 5/0057 |
| 2022/0279584 | A1 | 9/2022 | Zhu |

FOREIGN PATENT DOCUMENTS

| | | | |
|---|---|---|---|
| KR | 10-2017-0053470 | A | 5/2017 |
| KR | 10-2019-0031119 | A | 3/2019 |
| KR | 10-2019-0087656 | A | 7/2019 |
| WO | 2018/155820 | A1 | 8/2018 |
| WO | 2019/156542 | A1 | 8/2019 |
| WO | 2019/157919 | A1 | 8/2019 |
| WO | 2019/216705 | A1 | 11/2019 |
| WO | 2020/032783 | A1 | 2/2020 |
| WO | 2020/033505 | A1 | 2/2020 |
| WO | 2020/139050 | A1 | 7/2020 |

OTHER PUBLICATIONS

Extended European Search Report dated Aug. 22, 2023, issued in European Patent Application No. 23174327.9.
3GPP TS 37.213 V16.0.0, 3rd Generation Partnership Project; Technical Specification Group Radio Access Network; Physical layer procedures for shared spectrum channel access (Release 16), Dec. 2019.
Extended European Search Report dated Dec. 20, 2022, issued in European Patent Application No. 21754321.4.
Chinese Office Action dated Mar. 22, 2025, issued in Chinese Application No. 202180014448.7.
Nokia et al., On support of UL transmission with configured grants in NR-U, R1-1904185, 3GPP TSG RAN WG1 Meeting #96bis, Xi'an, China, Mar. 30, 2019.
Chinese Notice of Allowance dated Aug. 28, 2025, issued in Chinese Patent Application No. 202180014448.7.
European Notice of Allowance dated Jul. 25, 2025, issued in European Patent Application No. 23174327.9.
Korean Office Action dated Jan. 5, 2026, issued in Korean Application No. 10-2020-0042982.
European Notice of Allowance dated Nov. 21, 2025, issued in European Application No. 23174327.9.

* cited by examiner

FIG. 3

METHOD AND APPARATUS FOR FEEDING BACK HARQ-ACK IN WIRELESS COMMUNICATION SYSTEM

TECHNICAL FIELD

The disclosure relates to a method and apparatus for feeding back hybrid automatic repeat request-acknowledgement (HARQ-ACK) in a wireless communication system. More particularly, the disclosure relates to a method by which a wireless communication system, in particular, a system and node for receiving an uplink signal or transmitting a downlink signal in an unlicensed band, transmits information indicating decoding failure or success of an uplink signal to a system and node which attempt to transmit an uplink signal.

BACKGROUND ART

To meet significantly increasing demand with respect to wireless data traffic due to the commercialization of 4th generation (4G) communication systems and the increase in multimedia services, evolved 5th generation (5G) system or pre-5G communication system are developed. For this reason, 5G communication systems or pre-5G communication systems are called 'beyond 4G network communication systems' or 'post long term evolution (LTE) systems'.

In order to increase a data rate, consideration is given to implementing 5G communication systems in ultra-high frequency bands (millimeter wave (mmW)) (e.g., 60 GHz). In order to reduce propagation path loss of radio waves and increase a propagation distance of radio waves in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna.

Also, in order to improve system networks, for 5G communication systems, technologies such as evolved small cell, advanced small cell, cloud radio access network (cloud RAN), ultra-dense network, device-to-device (D2D) communication, wireless backhaul, moving network, cooperative communication, coordinated multi-points (CoMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

DESCRIPTION OF EMBODIMENTS

Technical Problem

The disclosure is to provide a method and apparatus for feeding back hybrid automatic repeat request-acknowledgement (HARQ-ACK) in a wireless communication system.

Solution to Problem

According to an embodiment of the disclosure, provided is a terminal that receives, from a base station, first configuration information for code block group (CBG)-based uplink transmission, and second configuration information including a downlink feedback information (DFI) bitmap configuration method, transmits a CBG-based uplink signal to the base station, based on the first configuration information, receives, from the base station, DFI including feedback information about the CBG-based uplink signal, based on the second configuration information, and determines a contention window value of the terminal, based on the feedback information included in the received DFI.

Advantageous Effects of Disclosure

According to an embodiment of the disclosure, hybrid automatic repeat request-acknowledgement (HARQ-ACK) feedback may be further efficiently transmitted or received in a wireless communication system.

BRIEF DESCRIPTION OF DRAWINGS

FIG. 3 is a diagram showing a downlink or uplink scheduling method and a resource region in an NR system.

BEST MODE

Figure 1:
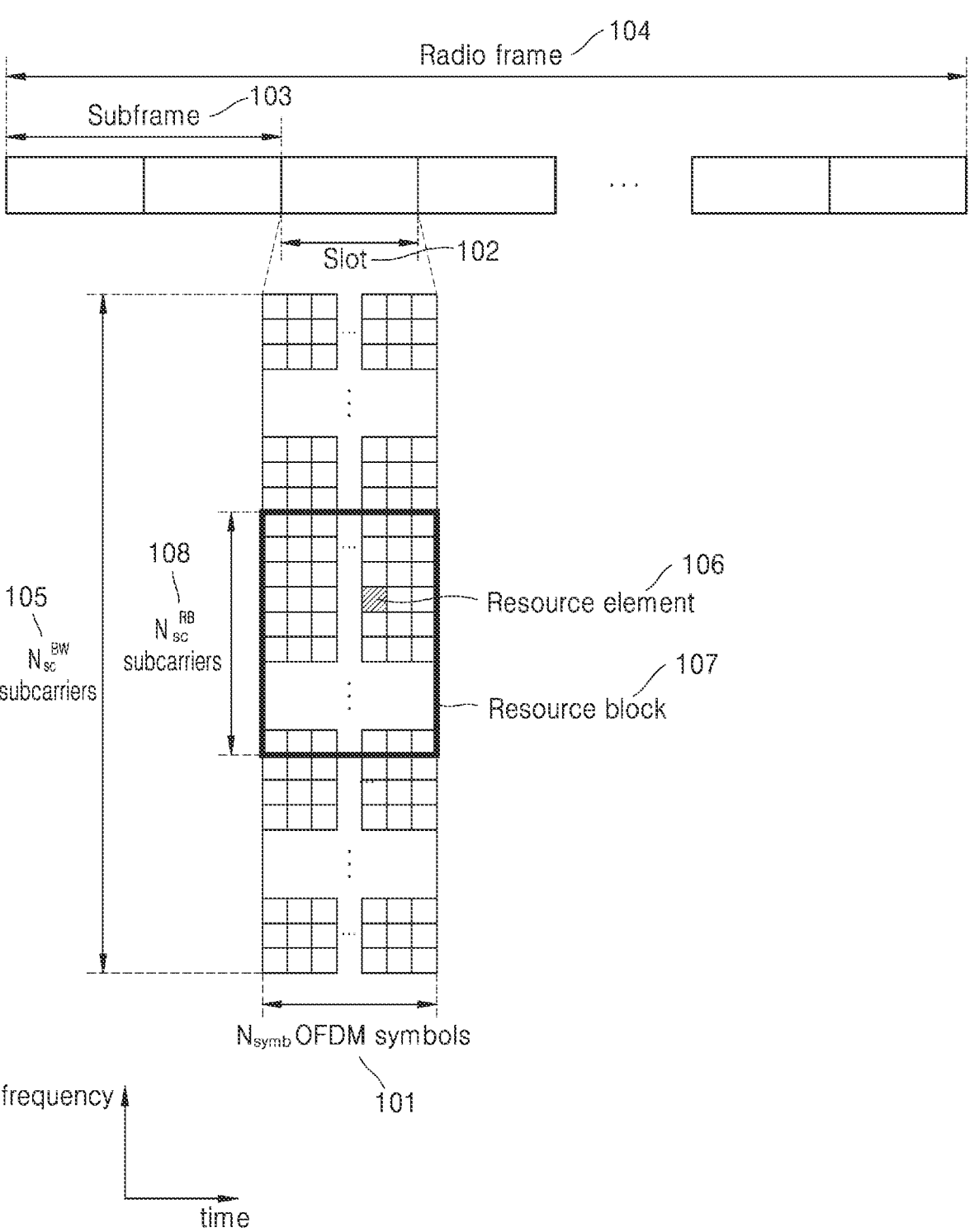
FIG. 1 is a diagram showing a structure of uplink/downlink time-frequency domain transmission in a new radio (NR) system.

According to an embodiment of the disclosure, a method by which a terminal performs transmission and reception of data and feedback in a wireless communication system, includes transmitting, by a base station, downlink feedback information (DFI) determination-related information; configuring, by the base station, a DFI bitmap; receiving, by the terminal, the DFI determination-related information from the base station; and decoding, by the terminal, the DFI bitmap and controlling retransmission and a contention window value, in response to receiving, from the base station, DFI based on the configured DFI determination-related information.

According to an embodiment of the disclosure, a terminal for performing transmission and reception of data in a wireless communication system, includes: a transceiver; and at least one processor configured to: receive, from a base station, first configuration information for code block group (CBG)-based uplink transmission, and second configuration information including a downlink feedback information (DFI) bitmap configuration method; transmit a CBG-based uplink signal to the base station, based on the first configuration information; receive, from the base station, DFI including feedback information about the CBG-based uplink signal, based on the second configuration information; and determine a contention window value of the terminal, based on the feedback information included in the received DFI. The DFI bitmap configuration method may indicate whether the feedback information is for feedback in units of transport blocks (TBs) or for feedback for one or more CBGs.

The CBG-based uplink signal may include one or more uplink signals transmitted in a first slot, wherein the at least one processor may be further configured to: identify the feedback information included in the received DFI as feedback information in units of TBs, based on the second configuration information; when at least one of pieces of feedback information about the one or more uplink signals transmitted in the first slot is acknowledgement (ACK), determine the contention window value to be a first contention window value or maintain a current contention window value; and when all pieces of feedback information about the one or more uplink signals transmitted in the first slot is negative acknowledgement (NACK), determine the contention window value to be a second contention window value. The current contention window value may be equal to or greater than the first contention window value and equal to or less than the second contention window value.

The at least one processor may be further configured to: identify the feedback information included in the received DFI as feedback information in units of CBGs, based on the second configuration information; determine feedback information of CBGs configuring each of a plurality of slots, based on the feedback information included in the received DFI; determine proportions of ACK and NACK in units of CBGs for a reference slot included in the plurality of slots, based on the determined feedback information of the CBGs configuring each of the plurality of slots; and change or maintain the contention window value, based on the determined proportions.

The feedback information included in the DFI may include feedback information about one or more CBG-based uplink signals transmitted in a first slot, wherein the feedback information about the one or more CBG-based uplink signals transmitted in the first slot may be irrelevant to retransmission of the one or more CBG-based uplink signals transmitted in the first slot, and may be used to determine the contention window value of the terminal.

The at least one processor may be further configured to: receive, from the base station, uplink (UL) grant downlink control information (DCI) including feedback information in units of TBs or CBGs, about the CBG-based uplink signal; determine whether the feedback information included in the received DFI and the feedback information included in the UL grant DCI are the same; and when the feedback information included in the received DFI and the feedback information included in the UL grant DCI are different from each other, determine the contention window value of the terminal based on at least one of the feedback information included in the received DFI and the feedback information included in the UL grant DCI.

The feedback information included in the DFI may include feedback information about one or more CBG-based uplink signals transmitted in a first slot corresponding to a reference slot, the at least one processor may be further configured to receive, from the base station, UL grant DCI including feedback information in units of TBs or CBGs, about the CBG-based uplink signal, and the UL grant DCI may be used to determine the contention window value of the terminal when the UL grant DCI is received before the DFI or when the first slot is the reference slot after the UL grant DCI is received and another uplink signal is not transmitted after the DFI is received.

The CBG-based uplink signal may include an uplink signal scheduled by the base station.

According to another embodiment of the disclosure, a base station for performing transmission and reception of data in a wireless communication system, includes: a transceiver; and at least one processor configured to: transmit, to a terminal, first configuration information for code block group (CBG)-based uplink transmission, and second configuration information including a downlink feedback information (DFI) bitmap configuration method; receive a CBG-based uplink signal from the terminal, based on the first configuration information; decode the received CBG-based uplink signal in units of CBGs, based on the second configuration information; and transmit, to the terminal, DFI including feedback information about the CBG-based uplink signal, based on a result of the decoding, wherein the DFI including the feedback information about the CBG-based uplink signal is used to determine a contention window value of the terminal, and the DFI bitmap configuration method indicates whether feedback is feedback in units of transport blocks (TBs) or feedback for one or more CBGs.

The feedback information included in the DFI may include feedback information about one or more CBG-based uplink signals transmitted in a first slot, wherein the feedback information about the one or more CBG-based uplink signals transmitted in the first slot may be irrelevant to retransmission of the one or more CBG-based uplink signals transmitted in the first slot, and may be used to determine the contention window value of the terminal.

The at least one processor may be further configured to transmit, to the terminal, uplink (UL) grant downlink control information (DCI) including feedback information in units of TBs or CBGs, about the CBG-based uplink signal, and the contention window value of the terminal may be determined based on at least one of the feedback information included in the DFI and the feedback information included in the UL grant DCI.

The CBG-based uplink signal may include an uplink signal scheduled by the base station.

According to another embodiment of the disclosure, an operation method of a terminal for performing transmission and reception of data in a wireless communication system, includes: receiving, from a base station, first configuration information for code block group (CBG)-based uplink transmission, and second configuration information including a downlink feedback information (DFI) bitmap configuration method; transmitting a CBG-based uplink signal to the base station, based on the first configuration information; receiving, from the base station, DFI including feedback information about the CBG-based uplink signal, based on the second configuration information; and determining a contention window value of the terminal, based on the feedback information included in the received DFI, wherein the DFI bitmap configuration method indicates whether feedback is feedback in units of transport blocks (TBs) or feedback for one or more CBGs.

MODE OF DISCLOSURE

Hereinafter, embodiments of the disclosure will be described with reference to accompanying drawings. While describing embodiments, technical content that is well-known in the art and not directly related to the disclosure will not be provided. This is to clearly convey the points of the disclosure by omitting an unnecessary explanation.

For the same reasons, some elements are exaggerated, omitted, or schematically illustrated in drawings. Also, a size of each element does not entirely reflect a real size of the element. In the drawings, like elements are denoted by like reference numerals.

The advantages and features of the disclosure and methods of achieving them will become apparent with reference to embodiments described in detail below with reference to the accompanying drawings. In this regard, the embodiments of the disclosure may have different forms and should not be construed as being limited to the descriptions set forth herein. Rather, these embodiments are provided so that the disclosure will be thorough and complete and will fully convey the concept of the disclosure to one of ordinary skill in the art, and the disclosure will only be defined by the appended claims. In the specification, the same reference numerals denote the same elements.

It will be understood that blocks in flowcharts or combinations of the flowcharts may be performed by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer-executable or computer-readable memory that may direct a computer or other programmable data processing apparatus to function in a particular manner, the instructions stored in the computer-executable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

As used herein, the term "unit" denotes a software element or a hardware element such as a field-programmable gate array (FPGA) or an application-specific integrated circuit (ASIC), and performs a certain function. However, the term "unit" does not mean to be limited to software or hardware. The term "unit" may be configured to be in an addressable storage medium or configured to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and "units" may be combined into fewer components and "units" or further separated into additional components and "units". Further, components and "units" may be implemented to operate one or more central processing units (CPUs) in a device or a secure multimedia card. Also, according to embodiments, "unit" may include one or more processors. In a 5th generation (5G) system, supports for various services compared to an existing 4th generation (4G) system are considered. Examples of representative services may include enhanced mobile broadband (eMBB), ultra-reliable and low latency communications (URLLC), massive machine type communications (mMTC), and evolved multimedia broadcast/multicast service (eM-BMS). A system providing the URLLC service may be referred to as a URLLC system, and a system providing the eMBB service may be referred to as an eMBB system. Also, the terms "service" and "system" may be interchangeably used.

As described above, a plurality of services may be provided to a user in a communication system, and in order to provide the plurality of services to the user, there is a demand for an apparatus and method for providing the services in a same time domain according to characteristics of the services.

In a wireless communication system, for example, a long term evolution (LTE) or LTE-advanced (LTE-A) system or a 5G new radio (NR) system, a base station may transmit, through a downlink control channel (physical downlink control channel (PDCCH)), downlink control information (DCI) including resource allocation information, through which a downlink signal transmitted from the base station to a terminal is transmitted, to the terminal, thereby configuring the terminal to receive at least one downlink signal from among downlink control information (e.g., a channel-state information reference signal (CSI-RS)), a broadcast channel (physical broadcast channel (PBCH), and a downlink data channel (physical downlink shared channel (PDSCH). For example, the base station transmits, through a PDCCH, DCI indicating reception of a PDSCH in a subframe n to the terminal, and the terminal receiving the DCI receives the PDSCH in the subframe n according to the received DCI. In the LTE, LTE-A, or NR system, the base station may transmit, through the downlink control channel (PDCCH), DCI including uplink resource allocation information to the terminal, thereby configuring the terminal to transmit at least one uplink signal from among uplink control information (e.g., a sounding reference signal (SRS), uplink control information (UCI), or physical random access channel (PRACH)) and uplink data channel (physical uplink shared channel (PUSCH)) to the base station. For example, the terminal receiving uplink transmission configuration information (or uplink DCI or UL grant) transmitted through the PDCCH from the base station in the subframe n may perform uplink data channel transmission (hereinafter, referred to as PUSCH transmission) according to a preconfigured time (e.g., n+4), a time configured through higher layer signaling (e.g., n+k), or uplink signal transmission time indicator information (e.g., n+k) included in the uplink transmission configuration information.

When the configured downlink transmission is performed from the base station to the terminal through an unlicensed band or the configured uplink transmission is performed from the terminal to the base station through an unlicensed band, a transmission device (the base station or the terminal) may perform a channel access procedure (or listen-before talk (LBT)) for the unlicensed band in which the signal transmission is configured before or immediately before a time at which the configured signal transmission starts, and when it is determined that the unlicensed band is in an idle state based on the result of the channel access procedure, may access the unlicensed band and perform the configured signal transmission. When it is determined that the unlicensed band is not in the idle state or is in an occupied state according to the channel access procedure performed by the transmission device, the transmission device may be unable to access the unlicensed band and thus may not perform the configured signal transmission. In the channel access procedure in the unlicensed band in which the signal transmission is configured, the transmission device receives a signal in the unlicensed band during a certain time or a time calculated according to a predefined rule (e.g., a time calculated through one random value selected by at least the base station or the terminal) and compares an intensity of the received signal with a predefined threshold value or a threshold value calculated by a function including at least one parameter from among a channel bandwidth, a signal bandwidth in which the signal to be transmitted is transmitted, an intensity of transmission power, and a beam width of the transmitted signal, so as to determine whether the unlicensed band is in the idle state. For example, when the intensity of the signal received by the transmission device during 25 us is smaller than a predefined threshold value of −72 dBm, it may be determined that the unlicensed band is in the idle state and the configured signal transmission may be performed. In this case, a maximum time during which the signal is transmitted may be limited according to a maximum channel occupancy time defined for each country or each region in the unlicensed band or a type of the transmission device (e.g., the base station, the terminal, a master device, or a slave device). For example, in Japan, after performing a channel access procedure in an unlicensed band of 5 GHz, the base station or the terminal may occupy a channel during a maximum of 4 ms without an additional channel access procedure and may transmit a signal. When the intensity of the signal received during 25 us is greater than a predefined threshold value of −72 dBm, the base station determines that the unlicensed band is not in an idle state and does not transmit a signal.

In a 5G communication system, in order to provide various services and support a high data rate, various technologies for performing retransmission in units of code block groups and transmitting an uplink signal without uplink scheduling information have been introduced. Accordingly, when 5G communication is performed through the unlicensed band, a more efficient channel access procedure considering various parameters is needed.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like. Also, a 5G or new radio (NR) communication standards are being developed with 5G wireless communication systems.

In a wireless communication system including 5G, at least one service from among enhanced mobile broadband (eMBB), massive machine type communications (mMTC), and ultra-reliable and low-latency communications (URLLC) may be provided to the terminal. The services may be provided to the same terminal within the same time interval. In embodiments, the eMBB service may be for high-speed transmission of high-volume data, the mMTC service may be for minimization of power of the terminal and accesses by multiple terminals, and the URLLC service may be for high reliability and low latency, but the disclosure is not limited thereto. The three services may be main scenarios in the LTE system or the 5G/NR system after LTE.

When the base station schedules data corresponding to the eMBB service in any terminal in a specific transmission time interval (TTI) and URLLC data should be transmitted in the TTI, the base station does not transmit some of the eMBB data in the frequency band in which the eMBB data has already been scheduled and is being transmitted and transmits the generated URLLC data in the frequency band. A terminal that is scheduled with the eMBB data and a terminal that is scheduled with the URLLC data may be a same terminal or different terminals. In this case, some of the eMBB data which has already been scheduled and is being transmitted are not transmitted, and thus the risk of damage to the eMBB data increases. Accordingly, in this case, it is required to determine a method of processing a signal received by the terminal in which the eMBB data is scheduled or the terminal in which the URLLC data is scheduled and a method of receiving the signal.

Terms used below are defined in consideration of functions in the disclosure, and may have different meanings according to an intention of a user or operator, customs, or the like. Therefore, the terms used herein have to be defined based on the meaning of the terms together with the description throughout the specification. Hereinafter, a base station (BS) is an entity that assigns resources of a terminal, and may be at least one of an eNode B (eNB), a Node B (NB), a wireless access unit, a BS controller, or a node on a network. Examples of a terminal may include a user equipment (UE), a mobile station (MS), a cellular phone, a smartphone, a computer, a multimedia system capable of performing a communication function, or the like. In the disclosure, a downlink (DL) refers to a wireless transmission path of a signal that the base station transmits to the terminal, and an uplink (UL) refers to a wireless transmission path of a signal that the terminal transmits to the base station. Also, hereinbelow, one or more embodiments of the disclosure will be described as an example of an LTE or LTE-A system, but the one or more embodiments may also be applied to other communication systems having a similar technical background or channel form. For example, other communication systems may include 5G mobile communication technology (5G, new radio, or NR) developed after LTE-A. Furthermore, embodiments of the disclosure are applicable to other communication systems through modification at the discretion of one of ordinary skill in the art without greatly departing from the scope of the disclosure.

The NR system, which is a representative example of the broadband wireless communication system, employs an orthogonal frequency division multiplexing (OFDM) scheme for a downlink (DL), and employs both the OFDM scheme and a single carrier frequency division multiple access (SC-FDMA) scheme for an uplink (UL). The uplink is a radio link through which the terminal (or user equipment (UE)) or a mobile station (MS) transmits data or a control signal to the base station (or an eNode B), and the downlink is a radio link through which the base station transmits data or a control signal to the terminal. In such a multiple access scheme, data or control information of each user is classified by generally allocating and operating the data or control information such that time-frequency resources for transmitting data or control information for each user do not overlap each other, that is, such that orthogonality is established.

The NR system employs a hybrid automatic repeat request (HARQ) scheme that retransmits the corresponding data on a physical layer when decoding fails at the initial transmission. In the HARQ scheme, when a receiver does not accurately decode data, the receiver transmits information (negative acknowledgement (NACK)) indicating a failure in decoding to a transmitter, so that the transmitter retransmits the corresponding data on the physical layer. The receiver increases data reception performance by combining the data retransmitted by the transmitter with the data of which decoding failed. Also, when the receiver accurately decodes data, the receiver transmits information (acknowledgement (ACK)) indicating a success in decoding to the transmitter, so that the transmitter transmits new data.

FIG. 1 is a diagram showing a structure of uplink/downlink time-frequency domain transmission in an NR system.

Referring to FIG. 1, a horizontal axis represents a time domain and a vertical axis represents a frequency domain. In the time domain, a minimum transmission unit is an OFDM or DFT-s-OFDM symbol, and $N_{symb}$ OFDM or DFT-s-OFDM symbols 101 configure one slot 102. Here, an OFDM symbol indicates a symbol for a case where a signal is transmitted or received by using an OFDM scheme, and a DFT-s-OFDM symbol indicates a symbol for a case where a signal is transmitted or received by using a DFT-s-OFDM or SC-FDMA scheme. Hereinafter, the disclosure will be described based on the OFDM symbol without distinction between the OFDM symbol and the DFT-s-OFDM symbol for convenience of explanation, and the description will be made based on downlink signal transmission/reception but may also be applied to uplink signal transmission/reception.

When a subcarrier spacing is 15 kHz, one slot constitutes one subframe 103, and a length of each of a slot and a subframe may be 1 ms. Here, the number of slots and lengths of the slots constituting one subframe 103 may vary according to the subcarrier spacing. For example, when the subcarrier spacing is 30 kHz, two slots may constitute one subframe 103. At this time, a length of the slot is 0.5 ms and a length of the subframe is 1 ms. Further, a radio frame 104 is a time domain interval composed of 10 subframes. A minimum transmission unit in the frequency domain is a subcarrier, and an entire system transmission band (transmission bandwidth) includes a total of $N_{sc}^{BW}$ subcarriers 105. However, such specific numerical values may be variously applied. For example, in an LTE system, a subcarrier spacing is 15 kHz, but two slots constitute one subframe 103, wherein a length of the slot is 0.5 ms and a length of the subframe is 1 ms.

A base unit of a resource in a time-frequency domain may be a resource element (RE) 106, and the RE 106 may be represented by an OFDM symbol index and a subcarrier index. A resource block (RB or physical resource block (PRB)) 107 may be defined by the $N_{symb}$ consecutive OFDM symbols 101 in the time domain and $N_{SC}^{RB}$ consecutive subcarriers 108 in the frequency domain. Accordingly, one RB 107 in one slot may include $N_{symb} \times N_{SC}^{RB}$ REs. In general, a minimum allocation unit of data in the frequency domain is the RB 107. In the NR system, generally, $N_{symb}=14$ and $N_{SC}^{RB}=12$, and the number $N_{RB}$ of RBs may vary according to a bandwidth of a system transmission band. In the LTE system, generally, $N_{symb}=7$ and $N_{SC}^{RB}=12$, and $N_{RB}$ may vary according to a bandwidth of a system transmission band.

Downlink control information may be transmitted within first N OFDM symbols in the subframe. In general, N={1, 2, 3}, and a terminal may be configured with the number of symbols on which downlink control information may be transmitted, from a base station through higher layer signaling. The base station may change the number of symbols on which the downlink control information may be transmitted in each slot according to the amount of control information to be transmitted in a current slot, and may transmit information on the number of symbols to the terminal through a separate downlink control channel.

In the NR or LTE system, scheduling information of downlink data or uplink data may be transmitted from the base station to the terminal through the downlink control information (DCI). The DCI is defined according to various formats, and may indicate, according to each format, whether the scheduling information is uplink data scheduling information (UL grant) or downlink data scheduling information (DL grant), whether the DCI is compact DCI having a small size of control information, whether the DCI is fall-back DCI, whether spatial multiplexing using multiple antennas is applied, or whether the DCI is DCI for controlling power. For example, a DCI format (e.g., DCI format 0_1 of NR), which is scheduling control information for uplink data (UL grant), may include one of at least following pieces of control information.

Carrier indicator—0 or 3 bits
UL/SUL indicator—0 or 1 bit
Downlink feedback information (DFI) flag—0 or 1 bit
1 bit, when the terminal monitors the DCI format 0_1 having a CRC scrambled with CS-RNTI and performs a channel access in a shared spectrum. When a bit value is 0, activation of type 2 CG transmission is indicated, and when the bit value is 1, CG-DFI is indicated. When the terminal receives the DCI format 0_1 having a CRC scrambled with C-RNTI/SP-CSI-RNTI/MCS-C-RNTI, a corresponding bit may be reserved.

0 bit otherwise;

Identifier for DCI formats—[1] bits

Bandwidth part indicator—0, 1, or 2 bits

Frequency domain resource assignment

For resource allocation type 0, $\lceil N_{RB}^{ULBWP}/P \rceil$ bits

For resource allocation type 1, $\lceil \log_2 (N_{RB}^{ULBWP} (N_{RB}^{ULBWP}+1)/2 \rceil$ bits Time domain resource assignment—1, 2, 3, or 4 bits Virtual resource block-to-physical resource block (VRB-to-PRB) mapping—0 or 1 bit, only for resource allocation type 1.

0 bit if only resource allocation type 0 is configured;

1 bit otherwise.

Frequency hopping flag—0 or 1 bit, only for resource allocation type 1.

0 bit if only resource allocation type 0 is configured;

1 bit otherwise.

Modulation and coding scheme—5 bits

New data indicator—1 bit

Redundancy version—2 bits

HARQ process number—4 bits

1st downlink assignment index—1 or 2 bits 1 bit for semi-static HARQ-ACK codebook;

2 bits for dynamic HARQ-ACK codebook with single HARQ-ACK codebook.

2nd downlink assignment index—0 or 2 bits 2 bits for dynamic HARQ-ACK codebook with two HARQ-ACK sub-codebooks;

0 bit otherwise.

TPC command for scheduled PUSCH—2 bits

SRS resource indicator—

$$\left\lceil \log_2 \left( \sum_{k=1}^{L_{max}} \binom{N_{SRS}}{k} \right) \right\rceil$$

or $\lceil \log_2 (N_{SRS}) \rceil$ bits $$\left\lceil \log_2 \left( \sum_{k=1}^{L_{max}} \binom{N_{SRS}}{k} \right) \right\rceil$$

bits for non-codebook based PUSCH transmission;

$\lceil \log_2 (N_{SRS}) \rceil$ bits for codebook based PUSCH transmission.

Precoding information and number of layers—up to 6 bits

Antenna ports—up to 5 bits

SRS request—2 bits

Channel state information (CSI) request—0, 1, 2, 3, 4, 5, or 6 bits

Code block group (CBG) transmission information—0, 2, 4, 6, or 8 bits

Phase tracking reference signal (PTRS)-demodulation reference signal (DMRS) association—0 or 2 bits beta offset indicator—0 or 2 bits DMRS sequence initialization—0 or 1 bit The DCI may be transmitted on a physical downlink control channel (PDCCH) (hereinafter, interchangeably used with control information) or an enhanced PDCCH (EPDCCH) (hereinafter, interchangeably used with enhanced control information) after channel coding and modulation processes. When a DFI field among the DCI fields indicates 1, i.e., when the DCI format 0_1 is used for configured grant downlink feedback information (CG-DFI), a field of DCI format 0_1 may include following control information.

HARQ-ACK bitmap—16 bits, where the order of the bitmap to HARQ process index mapping is such that HARQ process indices are mapped in ascending order from MSB to LSB of the bitmap. For each bit of the bitmap, value 1 indicates ACK, and value 0 indicates NACK TPC command for scheduled PUSCH All the remaining bits in format 0_1 are set to zero In general, the DCI is scrambled with a particular radio network temporary identifier (RNTI) (or a terminal identifier C-RNTI), independently for each terminal, is added with a cyclic redundancy check (CRC), is channel coded, and then is configured to each independent PDCCH and transmitted. In a time domain, the PDCCH is mapped and transmitted for a control channel transmission interval. A mapping location of the PDCCH in a frequency domain may be determined by an identifier (ID) of each terminal, and may be distributed and transmitted over an entire system transmission band.

Downlink data may be transmitted through a physical downlink shared channel (PDSCH) that is a physical channel for downlink data transmission. The PDSCH may be transmitted after the control channel transmission interval, and a detailed mapping location in the frequency domain and scheduling information such as a modulation scheme are determined based on the DCI transmitted through the PDCCH.

The base station may notify the terminal of a modulation scheme applied to the PDSCH to be transmitted and a size of data (transport block size (TBS)) to be transmitted through a modulation coding scheme (MCS) in the control information configuring the DCI. According to an embodiment, the MCS may be composed of 5 bits, or may be composed of bits less than or greater than 5 bits. The TBS corresponds to a size before channel coding for error correction is applied to data (transport block (TB)) to be transmitted by the base station.

In the disclosure, a TB may include a medium access control (MAC) header, an MAC control element (CE), and one or more MAC service data units (SDUs), and padding bits. Alternatively, as another example, the TB may indicate a data unit or an MAC protocol data unit (PDU) from an MAC layer to a physical layer.

Modulation schemes supported by the NR system include quadrature phase shift keying (QPSK), 16 quadrature amplitude modulation (QAM), 64 QAM, and 256 QAM, and modulation orders (Qm) thereof are respectively 2, 4, and 6. That is, 2 bits per symbol for QPSK modulation, 4 bits per symbol for 16 QAM modulation, 6 bits per symbol for 64 QAM modulation, and 8 bits per symbol for 256 QAM modulation may be transmitted. Also, modulation schemes higher than 256 QAM may be used according to system deformation.

In the NR system, an uplink/downlink HARQ adopts an asynchronous HARQ scheme in which a data retransmission time is not fixed. For example, in the case of downlink, when the base station receives, from the terminal, HARQ NACK as feedback on initially transmitted data, which is transmitted by the base station, the base station may arbitrarily determine a point of transmission time for data to be retransmitted, according to a scheduling operation. The terminal may buffer data determined as an error, as a result of decoding the received data for an HARQ operation, and may then combine the buffered data with the data retransmitted from the base station. HARQ ACK/NACK information of the PDSCH transmitted in a subframe n-k may be transmitted from the terminal to the base station through the PUCCH or the PUSCH in a subframe n. In the 5G communication system such as the NR system, the value of k may be transmitted while being included in DCI indicating or scheduling reception of the PDSCH transmitted in the subframe n-k, or may be configured in the terminal through higher layer signaling. In this case, the base station may configure one or more values of k through higher layer signaling, or may indicate a specific value of k through DCI. Here, k may be determined according to HARQ-ACK processing capability of the terminal, in other words, a minimum time required to receive the PDSCH and generate and report the HARQ-ACK for the PDSCH. Also, the terminal may use a default value or a predefined value before the value of k is configured.

In the NR system, a CRC may be added to the end or front of one TB to be transmitted from uplink or downlink. The CRC may have 16 bits, 24 bits, or a pre-fixed number of bits, or may have bits varying depending on a channel state, or the like, and may be used to determine whether channel coding is successful. A block to which the TB and the CRC are added may be divided into a plurality of code blocks (CBs). A maximum size of the CBs may be prefixed, and in this case, a last CB may be smaller than other CBs, or 0, a random value, or 1 may be inserted to the last CB such that lengths of the last CB and other CBs are the same. A CRC may be added to each CB, wherein the CRC may have 16 bits, 24 bits, or a pre-fixed number of bits, and may be used to determine whether channel decoding is successful. Here, in the NR system, to increase retransmission efficiency, transmission success or failure may be determined while performing decoding for each CB, instead of determining transmission success or failure in units of TBs. A result of decoding each CB is grouped in units of CBGs and transmitted as ACK or NACK. A maximum size of CBG is determined to be a value configured in a higher layer, and is identically applied to all HARQ process numbers.

Although the NR system has been described to describe a wireless communication system, and a method and apparatus according to embodiments of the disclosure, the disclosure is not limited to the NR system and may be applied to various wireless communication systems such as LTE, LTE-A, LTE-A-Pro, and 5G. Also, although the disclosure is described based on a system and device that transmit/receive a signal by using an unlicensed band have been described, the disclosure may also be applied to a system operating in a licensed band.

Hereinafter, in the disclosure, higher layer signaling or a higher layer signal is a method of transmitting a signal from the base station to the terminal by using a downlink data channel of a physical layer, or transmitting a signal from the terminal to the base station by using an uplink data channel of a physical layer, and includes a method of transmitting a signal through radio resource control (RRC) signaling, packet data convergence protocol (PDCP) signaling, or a media access control (MAC) control element (CE). The higher layer signaling or the higher layer signal may include system information, for example, a system information block (SIB), which is commonly transmitted to a plurality of terminals.

In a system that performs communication in an unlicensed band, a transmission device (the base station or the terminal) that is to transmit a signal through the unlicensed band may perform a channel access procedure (or listen-before-talk (LBT)) for the unlicensed band in which the communication is to be performed before transmitting the signal, and when it is determined that the unlicensed band is in an idle state according to the channel access procedure, may access the unlicensed band and transmit the signal. When it is determined, according to the channel access procedure, that the unlicensed band is not in the idle state, the transmission device is unable to transmit the signal.

In the channel access procedure in the unlicensed band, generally the transmission device measures an intensity of a signal received through the unlicensed band for a fixed time or a time calculated according to a predefined rule (e.g., a time calculated based on a random value selected by at least the base station or the terminal), and compares the measured intensity of the received signal with a predefined threshold value or a threshold value calculated by a function for determining the intensity of the received signal according to at least one parameter from among a channel bandwidth, a signal bandwidth in which the signal to be transmitted is transmitted, and an intensity of transmission power, so as to determine the idle state of the unlicensed band.

For example, the transmission device may measure the intensity of the received signal during X μs (e.g., 25 μs) immediately before the signal is to be transmitted, and when the measured intensity of the signal is smaller than a predefined or calculated threshold value T (e.g., −72 dBm), the transmission device may determine that the unlicensed band is in the idle state and may transmit the configured signal. A maximum time during which the signal may be successively transmitted after the channel access procedure may be limited according to a maximum channel occupancy time defined for each country, each region, or each frequency band, or a type of the transmission device (e.g., the base station, the terminal, a master device, or a slave device). For example, in Japan, after performing the channel access procedure in an unlicensed band of 5 GHz, the base station or the terminal may occupy a channel during a maximum of 4 ms in an unlicensed band determined to be in the idle state without additional channel access procedure and transmit a signal.

More specifically, when the base station or the terminal attempts to transmit a downlink or uplink signal in the unlicensed band, the channel access procedure that may be performed by the base station or the terminal may be classified into at least the following types.

Type 1: Performing uplink/downlink signal transmission after performing a channel access procedure during a variable time Type 2: Performing uplink/downlink signal transmission after performing a channel access procedure during a fixed time Type 3: Performing uplink or downlink signal transmission without performing a channel access procedure Hereinafter, although the disclosure interchangeably describes a case where the base station transmits a downlink signal to the terminal through the unlicensed band and a case where the terminal transmits an uplink signal to the base station through the unlicensed band, the description of the disclosure may be equally applied to a case where the terminal transmits an uplink signal to the base station through the unlicensed band and a case where the base station transmits a downlink signal to the terminal through the unlicensed band or some modifications thereof may be applied. Accordingly, detailed descriptions of downlink signal transmission/reception are omitted. Also, the disclosure assumes that one piece of data information (codeword or TB) or uplink data information is transmitted/received between the base station and the terminal. However, the description of the disclosure may also be applied to a case where the base station transmits downlink signals to a plurality of terminals or a case where a plurality of codewords or TBs are transmitted/received between the base station and the terminal.

A transmission node (hereinafter, referred to as the base station or the terminal) which attempts to transmit a signal through the unlicensed band may determine a channel access procedure scheme according to a type of the signal to be transmitted. For example, when the base station attempts to transmit a downlink signal including a downlink data channel in the unlicensed band, the base station may perform the channel access procedure of Type 1. Also, when the base station attempts to transmit a downlink signal, which does not include a downlink data channel, for example, a synchronization signal or a downlink control channel, in the unlicensed band, the base station may perform the channel access procedure of Type 2 and transmit the downlink signal.

The channel access procedure scheme may be determined according to a length of transmission of the signal to be transmitted in the unlicensed band or a length of a time or an interval occupying and using the unlicensed band. In general, it takes a longer time to perform the channel access procedure of Type 1 than the channel access procedure of Type 2. Accordingly, when a signal is transmitted during a short time interval or a time equal to or shorter than a reference time (e.g., X ms or Y symbols), the channel access procedure of Type 2 may be performed. On the other hand, when a signal is transmitted during a long time interval or a time longer than or equal to a reference time (e.g., X ms or Y symbols), the channel access procedure of Type 1 may be performed. In other words, channel access procedures of different types may be performed according to an unlicensed band use time.

When the channel access procedure of Type 1 is performed according to at least one of criteria above, a channel access priority class may be determined according to a quality of service class identifier (QCI) of a signal to be transmitted in the unlicensed band, and the channel access procedure may be performed by using at least one of predefined configuration values shown in Table 1 for the determined channel access priority class. For example, QCIs 1, 2, and 4 are QCI values for services such as conversational voice, conversational video (live streaming), and non-conversational video (buffered streaming), respectively. When a signal for a service that does not match a QCI in Table 1 is to be transmitted in the unlicensed band, a QCI, which is closest to the service and the QCI in Table 1, may be selected and a channel access priority class therefor may be selected.

Table 1 shows a mapping relationship between channel access priority classes and QCIs.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

For example, a defer duration, a set (CW_p) of contention window values or sizes, a minimum value and maximum value (CW_min,p and CW_max,p) of a contention window, and a maximum channel occupation interval (T_mcot,p) according to a determined channel access priority class p may be determined through Table 2. In other words, the base station that attempts to transmit a downlink signal through the unlicensed band performs the channel access procedure for the unlicensed band during at least T_f+m_p*T_sl. When the channel access procedure is performed with channel access priority class 3 (p=3), the size T_f+m_p*T_sl of the defer duration required to perform the channel access procedure may be configured by using m_p=3. When it is determined that the unlicensed band is in the idle state during the m_p*T_sl time, N=N−1. In this case, N is selected as a random integer value between 0 and a value of the contention window (CW_p) at the time when the channel access procedure is performed. In the case of channel access priority class 3, a minimum contention window and a maximum contention window are 15 and 63, respectively. When it is determined that the unlicensed band is in the idle state in the defer duration and an additional channel access procedure interval, the base station may transmit a signal through the unlicensed band for a time of T_mcot,p (8 ms). Table 2 shows channel access priority classes in downlink. Although the disclosure is described by using the downlink channel access priority classes for convenience of explanation, the channel access priority classes in Table 2 may be reused or channel access priority classes for uplink transmission may be defined and used in uplink.

TABLE 2

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial value (CW_p) of the contention window is the minimum value (CW_min,p) of the contention window. The base station selecting a value of N performs the channel access procedure in the T_sl interval, and when it is determined that the unlicensed band is in the idle state through the channel access procedure performed in the T_sl time, the base station may change N to N−1 (N=N−1) and when N=0, the base station may transmit a signal during for up to T_mcot,p through the unlicensed band. When the unlicensed band determined through the channel access procedure at the T_sl time is not in the idle state, the base station may perform the channel access procedure again without changing the value of N.

The value (CW_p) of the contention window may be changed based on a result of receiving a downlink (or uplink) data channel in a reference subframe, a reference duration, or a reference slot, from among a time point at which the base station (or terminal) initiates the channel access procedure, a time point at which the base station (or terminal) selects the N value to perform the channel access procedure, or a downlink (or uplink) signal transmission interval (or MCOT) transmitted most recently by the base station (or terminal) through the unlicensed band. In other words, the base station (or terminal) receives a report on the result of receiving, by the terminal, downlink (or uplink) data from the reference subframe, reference duration, or reference slot, and increase or minimize the size of CW_p according to a proportion (Z) of NACK or the number (or proportion) of ACK from among the received report on the result of receiving.

The initial value (CW_p) of the contention window is the minimum value (CW_min,p) of the contention window. The base station selecting the value of N performs the channel access procedure in the T_sl interval, and when it is determined that the unlicensed band is in the idle state as a result of the channel access procedure performed in the T_sl time, the base station may change N to N−1 (N=N−1) and when N=0, the base station may transmit a signal during for up to T_mcot,p through the unlicensed band. When the unlicensed band determined through the channel access procedure at the T_sl time is not in the idle state, the base station may perform the channel access procedure again without changing the value of N.

The value (CW_p) of the contention window may be changed based on the result of receiving the downlink (or uplink) data channel from the reference subframe, the reference duration, or the reference slot, from among a time point at which the base station (or terminal) initiates the channel access procedure, a time point at which the base station (or terminal) selects the N value to perform the channel access procedure, or the downlink (or uplink) signal transmission interval (or MCOT) transmitted most recently by the base station (or terminal) through the unlicensed band. In other words, the base station (or terminal) receives the report on the result of receiving, by the terminal, the downlink (or uplink) data from the reference subframe, reference duration, or reference slot, and increase or minimize the size of CW_p according to the proportion (Z) of NACK or the number (or proportion) of ACK from among the received report on the result of receiving.

Figure 2:
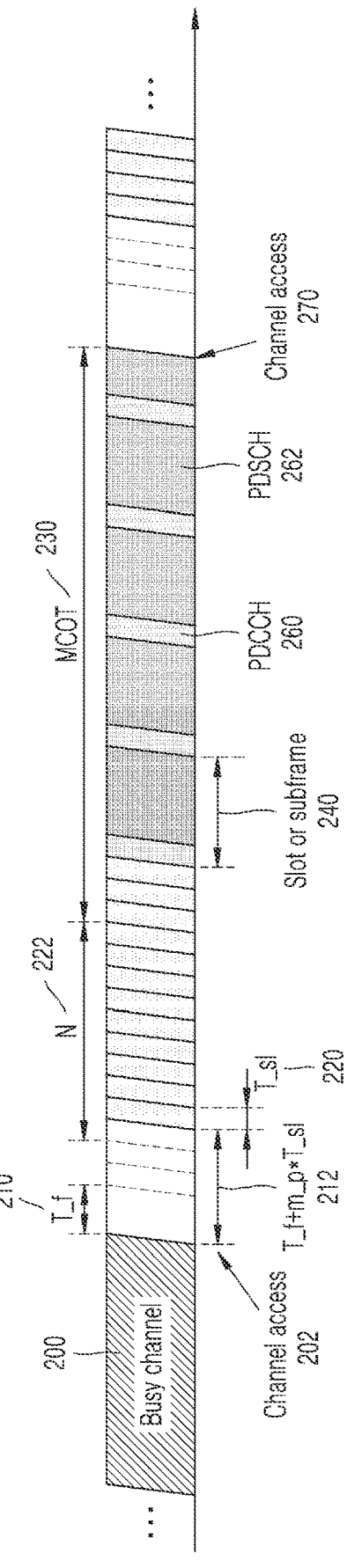
FIG. 2 is a diagram for describing a channel access procedure in an unlicensed band.

FIG. 2 is a diagram for describing a channel access procedure in an unlicensed band.

Referring to FIG. 2, a first transmission interval 240 of a downlink signal transmission interval 230 in which a base station most recently transmits a signal through an unlicensed band at a time point 270 at which the base station starts the channel access procedure or a time point at which or immediately before the base station selects a value of N to perform the channel access procedure is a reference slot for changing a contention window for the channel access procedure. When the base station is unable to receive a report on a reception result of a downlink data channel transmitted in the first slot 240 of the transmission interval 230, for example, when a time interval between the first slot and the time point 270 at which the base station starts the channel access procedure is equal to or less than n slots or subframes, i.e., when the base station starts the channel access procedure before a time at which a terminal is able to report the reception result of the downlink data channel for the first slot 240, a first subframe of a most recent downlink signal transmission interval before the downlink signal transmission interval 230 is a reference subframe. In other words, when the base station is unable to receive a reception result of downlink data transmitted in the reference slot 240 from the terminal at the time point 270 at which the base station starts the channel access procedure or the time point at which or immediately before the base station selects the value of N to perform the channel access procedure, the base station may determine, as the reference slot, a first slot of a most recently transmitted downlink signal transmission interval from among reception results of the downlink data channel previously received from terminals. The base station may determine the size of the contention window to be used in the channel access procedure, by using the reception results of the downlink data received from the terminals, the downlink data being transmitted in the reference slot through the downlink data channel For example, the base station that has transmitted a downlink signal through the channel access procedure (e.g., CW_p=15) configured through a channel access priority class 3 (p=3) may increase a value of the contention window from an initial value (CW_p=15) to a next contention window value (CW_p=31) when it is determined that at least 80% of the reception results of the terminal with respect to the downlink data transmitted to the terminal through the downlink data channel in the first slot from among downlink signals transmitted through the unlicensed band are NACK (or when all reception results are NACK). When the base station has transmitted the downlink signal based on CBG, the contention window may be increased from the initial value (CW_p=15) to the next contention window value (CW_p=31) when it is determined that at least 90% of the reception results of the terminal with respect to the CBGs transmitted to the terminal through the downlink data channel in the first slot from among the downlink signals transmitted through the unlicensed band are NACK.

When at least 80% of the reception results of the terminal are not determined to be NACK or when a reception result of at least one TB in the reference slot is determined to be ACK through another method, the base station may maintain the value of contention window to an existing value or change the same to the initial value of the contention window. When at least 10% of CBGs from among the reception results of the terminal are determined to be ACK during the CBG-based transmission of the base station, the base station may change the value of contention window to the initial value. In this case, the change in the contention window may be commonly applied to all channel access priority classes or may be applied only to the channel access priority class used for the channel access procedure. Here, a method of determining a reception result valid for determining a change in a size of the contention window, in other words, a method of determining a value of Z, from among the reception results of the downlink data which the terminal transmits or reports to the base station with respect to the downlink data transmitted through the downlink data channel in a reference subframe or the reference slot for determining the change in the size of the contention window is described below.

When the base station transmits one or more codewords or TBs to one or more terminals in the reference subframe or the reference slot, the base station may determine the value of Z based on a proportion of NACKs in the reception results transmitted or reported by the terminal for the TBs received in the reference subframe or the reference slot. For example, when two codewords or two TBs are transmitted to one terminal in the reference subframe or the reference slot, the base station receives or is reported reception results of downlink data signals for the two TBs from the terminal. When the proportion Z of NACKs in the two reception results is equal to or greater than a threshold value (e.g., Z=80%) predefined or configured between the base station and the terminal, the base station may change or increase the size of the contention window.

In this case, when the terminal bundles the reception results of downlink data for one or more subframes (e.g., M subframes) including the reference subframe or slot, and transmits or report the same to the base station, the base station may determine that the terminal transmits M reception results. The base station may determine the value of Z based on the proportion of NACKs in the M reception results, and change, maintain, or initialize the size of the contention window.

When the reference subframe is a reception result for a second slot among two slots included in one subframe, the value of Z may be determined based on a proportion of NACKs in reception results transmitted or reported by the terminal to the base station for downlink data received in the reference subframe (in other words, the second slot) and a next subframe.

Also, in a case where scheduling information or downlink control information for the downlink data channel transmitted by the base station is transmitted in a same cell or frequency band as that in which the downlink data channel is transmitted, or in a case where the scheduling information or downlink control information for the downlink data channel transmitted by the base station is transmitted in an unlicensed band but is transmitted in a cell or frequency band which is different from the cell in which the downlink data channel is transmitted, when it is determined that the terminal did not transmit the reception result of the downlink data received in the reference subframe or the reference slot and when the reception result of the downlink data transmitted by the terminal is determined to be discontinuous transmission (DTX), NACK/DTX, or any state, the base station may determine the reception result of the terminal as NACK and determine the value of Z.

Also, in a case where the scheduling information or downlink control information for the downlink data channel transmitted by the base station is transmitted through the licensed band, when the reception result of the downlink data transmitted by the terminal is determined to be DTX, NACK/DTX, or any state, the base station may not add the reception result of the terminal to the reference value Z of contention window variation. In other words, the base station may determine the value of Z while ignoring the reception result of the terminal Also, in a case where the base station transmits the scheduling information or downlink control information for the downlink data channel through the licensed band, when the base station actually transmits no downlink data (no transmission) in the reception result of the downlink data for the reference subframe or the reference slot transmitted or reported to the base station by the terminal, the base station may determine the value of Z while ignoring the reception result transmitted or reported by the terminal for the downlink data.

The 5G system is required to flexibly define and operate a frame structure in consideration of various services and requirements. For example, respective services may have different subcarrier spacings according to requirements. A plurality of subcarrier spacings supported by a current 5G communication system may be determined by using Equation 1 below.

$$\Delta f = f_0 2^m \qquad \text{Equation 1}$$

Here, $f_0$ indicates a base subcarrier spacing of a system and m denotes a scaling factor of an integer. For example, when $f_0$ is 15 kHz, a set of subcarrier spacings of the 5G communication system may include 3.75 kHz, 7.5 kHz, 15 kHz, 30 kHz, 60 kHz, 120 kHz, 240 kHz, and 480 kHz. An available subcarrier spacing set may vary according to frequency bands. For example, 3.75 kHz, 7.5 kHz, 15 kHz, 30 kHz, and 60 kHz may be used in a frequency band equal to or less than 6 GHz, and 60 kHz, 120 kHz, and 240 kHz may be used in a frequency band equal to or greater than 6 GHz.

A length of OFDM symbol may vary according to a subcarrier spacing constituting the OFDM symbol. This is because the subcarrier spacing and the length of the OFDM symbol have a reciprocal relationship therebetween according to characteristics of the OFDM symbol. For example, when the subcarrier spacing is doubled, the symbol length is shortened by ½, and when the subcarrier spacing is reduced by ½, the symbol length is doubled.

Next, a resource region in which a data channel is transmitted in the 5G communication system will be described.

Figure 3:
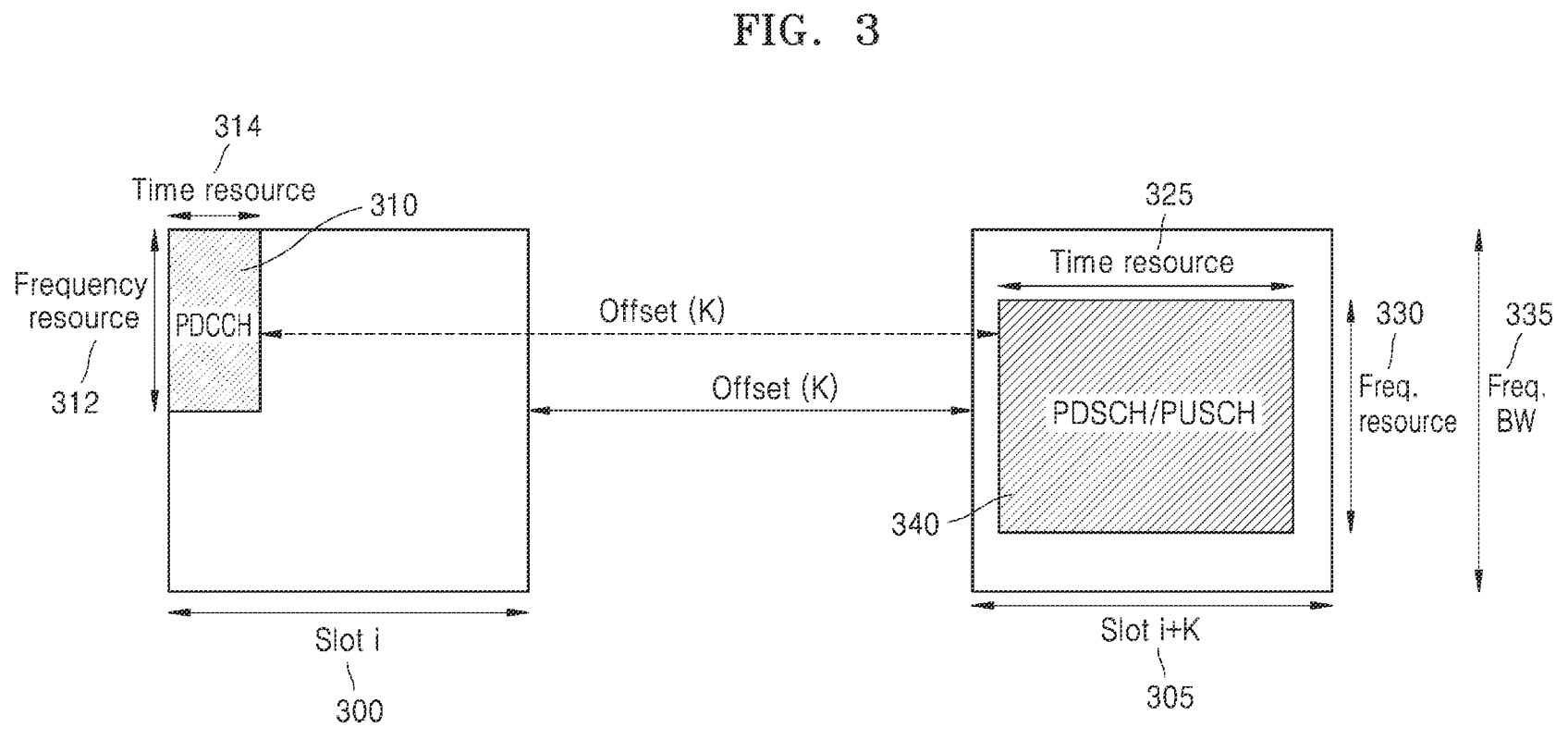

FIG. 3 is a diagram showing a downlink or uplink scheduling method and a resource region in an NR system.

A terminal monitors or searches for a PDCCH 310 in a downlink control channel (hereinafter, PDCCH) region (hereinafter, a control resource set (CORESET) or a search space (SS)) configured through higher layer signaling from a base station. The downlink control channel region may include information on a time domain 314 and a frequency domain 312, and the information on the time domain 314 may be configured in units of symbols and the information on the frequency domain 312 may be configured in units of RBs or groups of RBs. When the terminal detects the PDCCH 310 in a slot i 300, the terminal obtains downlink control information (DCI) transmitted through the detected PDCCH 310. Through the received DCI, the terminal may obtain scheduling information of a downlink data channel or an uplink data channel. In other words, the DCI may include at least information on a resource region (or a PDSCH transmission region) through which the terminal should receive the downlink data channel (hereinafter, a PDSCH) transmitted from the base station, or information on a resource region which the terminal is allocated with by the base station for uplink data channel (hereinafter, PUSCH) transmission. A case where the terminal is scheduled with the uplink data channel (PUSCH) transmission will be described below. Upon receiving the DCI, the terminal may obtain, through the DCI, a slot index or offset information K for receiving a PUSCH, and determine a PUSCH transmission slot index. For example, the terminal may determine that the terminal is scheduled to transmit the PUSCH in a slot i+K 305 through the received offset information K, based on the slot i 300 in which the PDCCH 310 is received. The terminal may also determine the slot i+K 305 or a PUSCH starting symbol or time in the slot i+K through the received offset information K, based on a CORESET in which the PDCCH 310 is received. Also, the terminal may obtain information on a time-frequency resource region 340 in the PUSCH transmission slot 305, based on the DCI. Here, PUSCH transmission frequency resource region information 330 may be PRB or PRB group unit information. Meanwhile, the PUSCH transmission frequency resource region information 330 is a region included in an initial uplink bandwidth (initial BW) or an initial uplink bandwidth part (initial BWP) determined or configured by the terminal through an initial access procedure. When the terminal receives an uplink bandwidth (BW) or an uplink bandwidth part (BPW) through higher layer signaling, the PUSCH transmission frequency resource region information 330 may be a region included in the uplink bandwidth (BW) or the uplink bandwidth part (BWP) configured through higher layer signaling.

PUSCH transmission time resource region information 325 may be symbol or symbol group unit information, or may be information indicating absolute time information. Here, the PUSCH transmission time resource region information 325 may be expressed in a combination of a PUSCH transmission starting time or symbol and a PUSCH length or a PUSCH ending time or symbol, and may be included as one field or value in the DCI. In this case, the PUSCH transmission time resource region information 325 may be included in the DCI as a field or value indicating each of the PUSCH transmission starting time or symbol and the PUSCH length or the PUSCH ending time or symbol. The terminal may transmit the PUSCH in the PUSCH transmission resource region 340 determined through the DCI.

In the 5G communication system, an uplink signal may be transmitted without uplink scheduling information so as to provide various services and support a high data rate. In detail, when the uplink signal is to be transmitted without the uplink scheduling information, information on resource allocation for uplink transmission, MCS, and the like may be configured through RRC signaling or DCI of a PDCCH, and the uplink transmission that may be performed may be distinguished as at least one of following types depending on an uplink transmission configuration reception method.

Type 1: Uplink transmission configuration using RRC signaling

Type 2: Uplink transmission configuration using downlink control channel of physical layer FIG. 4 is a diagram showing a downlink or uplink scheduling method and a resource region in an NR system.

Figure 4:
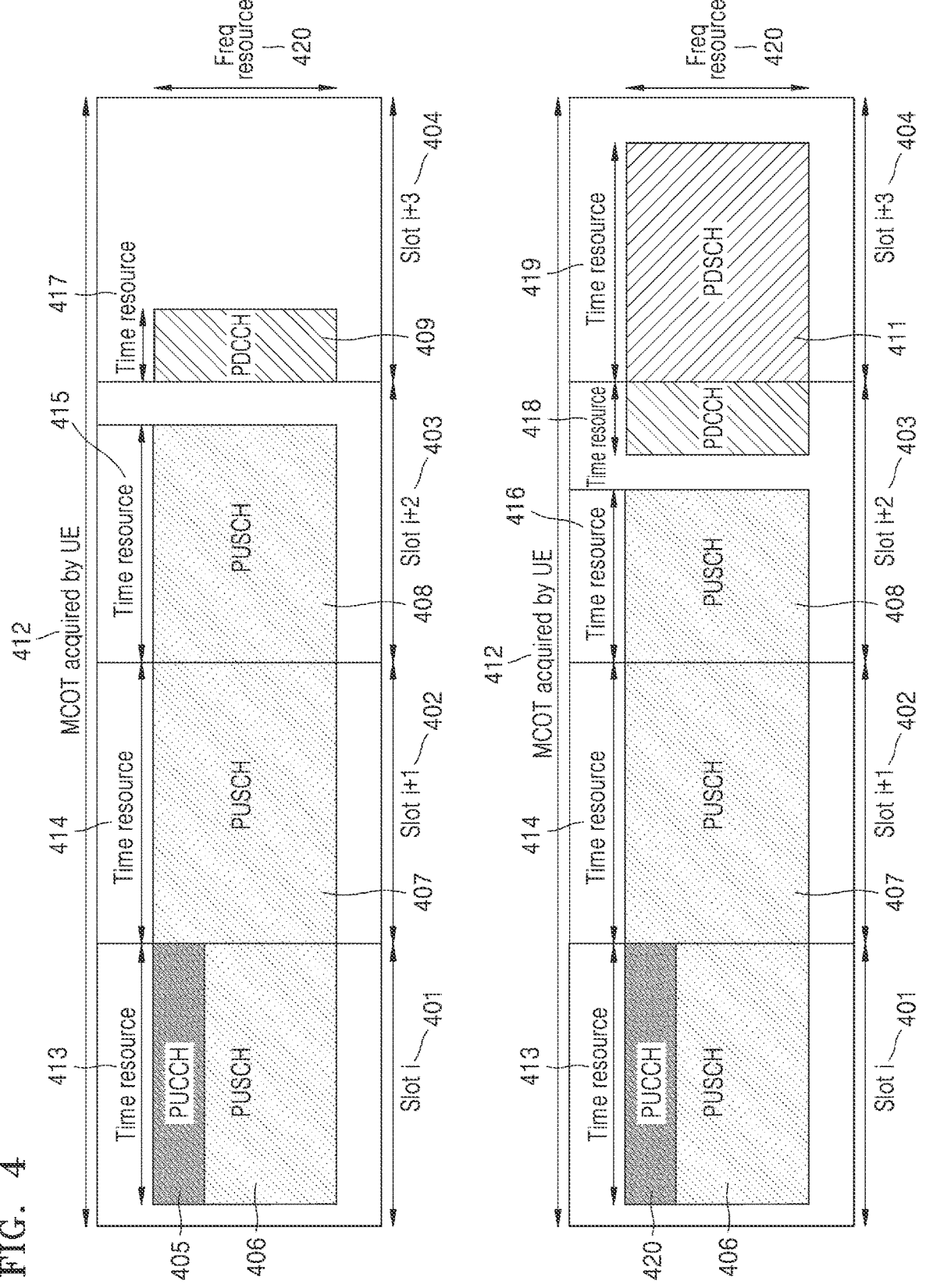
FIG. 4 is a diagram showing a downlink or uplink scheduling method and a resource region in an NR system.

Referring to FIG. 4, a case where an uplink signal is transmitted without uplink scheduling information in an unlicensed band is illustrated. In the unlicensed band, a channel access procedure is performed to transmit the uplink signal without the uplink scheduling information. Here, when a terminal accesses the unlicensed band by performing the channel access procedure during a variable time, the terminal may schedule downlink transmission in a last slot or last subframe 404 in a maximum channel occupancy time 412 through a channel occupancy time sharing indicator of uplink control information 405. Here, a base station determines a channel access by performing the channel access procedure during a fixed time, and the terminal configures, as a gap for the channel access procedure of the base station, a last symbol of a slot or subframe 408 for uplink transmission. The downlink transmission is limited to a PDCCH 409 as shown in FIG. 4, and a starting symbol of the PDCCH 409 is limited to a first symbol of the last slot or last subframe 404 and has a length of within two symbols.

Meanwhile, the base station may transmit, to the terminal, a result of decoding a received uplink signal, by using a bitmap of DCI format 0_1 (CG-DFI). Here, the base station may transmit ACK/NACK information on all HARQ process numbers through a bitmap. Also, the base station may indicate ACK/NACK feedback for transmission corresponding to each HARQ process number in 1 bit. An HARQ process number that is not yet transmitted or that is empty may be configured as a default value (NACK or ACK). Also, the terminal may change (or adjust) a contention window value described above by using the ACK/NACK information included in the bitmap. In the NR system, when transmitting an uplink signal of the terminal through a higher layer configuration, the base station may configure uplink signal transmission by dividing one TB (or PUSCH) into CBGs. In other words, the base station may receive one or more CBGs through one uplink signal (PUSCH or TB). Here, when transmitting, to the terminal, feedback information on the one or more CBGs transmitted through each HARQ process (or uplink signal), in the bitmap of CG-DFI, the base station may notify a reception result in information of 1 bit. Accordingly, a method of configuring the bitmap of CG-DFI by converting each reception result into the information of 1 bit when the base station receives the one or more CBGs, is required to be described.

In the disclosure, a method by which the base station configures the bitmap of CG-DFI and a method by which the terminal identifies and interprets the bitmap of CG-DFI received from the base station, when the terminal performs CBG-based uplink transmission to the base station for transmitting HARQ-ACK feedback in the bitmap of CG-DFI in the unlicensed band, will be described.

A method and apparatus described below in embodiments of the disclosure are not limitedly applied to each embodiment, and may be used for a method and apparatus for transmitting a bitmap of HARQ-ACK feedback by using a combination of all or some of the embodiments of the disclosure. An embodiment of the disclosure will be described with an example of a case where HARQ-ACK feedback for an uplink signal is transmitted, but the disclosure may also be applied to a case where a terminal transmits HARQ-ACK feedback for a downlink signal. In addition, an embodiment of the disclosure will be described based on a base station and terminal operating in an unlicensed band. However, the method and apparatus proposed in the embodiments of the disclosure may also be applied to the base station and terminal operating not only in the unlicensed band, but also in a licensed band or shared spectrum.

Embodiment 1

In the present embodiment, a method by which a base station indicates ACK/NACK transmission information for all HARQ processes by using a bitmap and a method by which a terminal determines received ACK/NACK information will be described for the base station and terminal operating in an unlicensed band.

Regarding the base station and terminal transmitting/receiving a signal in the unlicensed band, the terminal configured to perform PUCCH/PUSCH transmission in one or more slots through a configured grant configuration is assumed. Also, the terminal may perform the PUCCH/PUSCH transmission in the one or more slots based on the configured grant configuration from the base station. Upon receiving a configuration of configured grant transmission from the base station, the terminal may add an HARQ process number to an uplink control signal and transmit the same while transmitting a PUSCH. Here, the HARQ process number used for the configured grant transmission may be allocated by the base station, and may also be used for grant (scheduling)-based uplink transmission. Meanwhile, the base station may configure the terminal with CBG-based uplink transmission. When decoding a CBG-based uplink signal, the base station may determine transmission success or failure while performing the decoding on each code block. Also, the base station may configure, through L1 or higher layer signaling (for example, SIB, MIC, MAC-CE, or RRC signaling), whether to operate a scheme for configuring a bitmap of CG-DFI, based on a TB indicating HARQ-ACK feedback in 1-bit information for each HARQ process or based on a CBG indicating HARQ-ACK feedback for one or more CBGs for each HARQ process.

Figure 5:
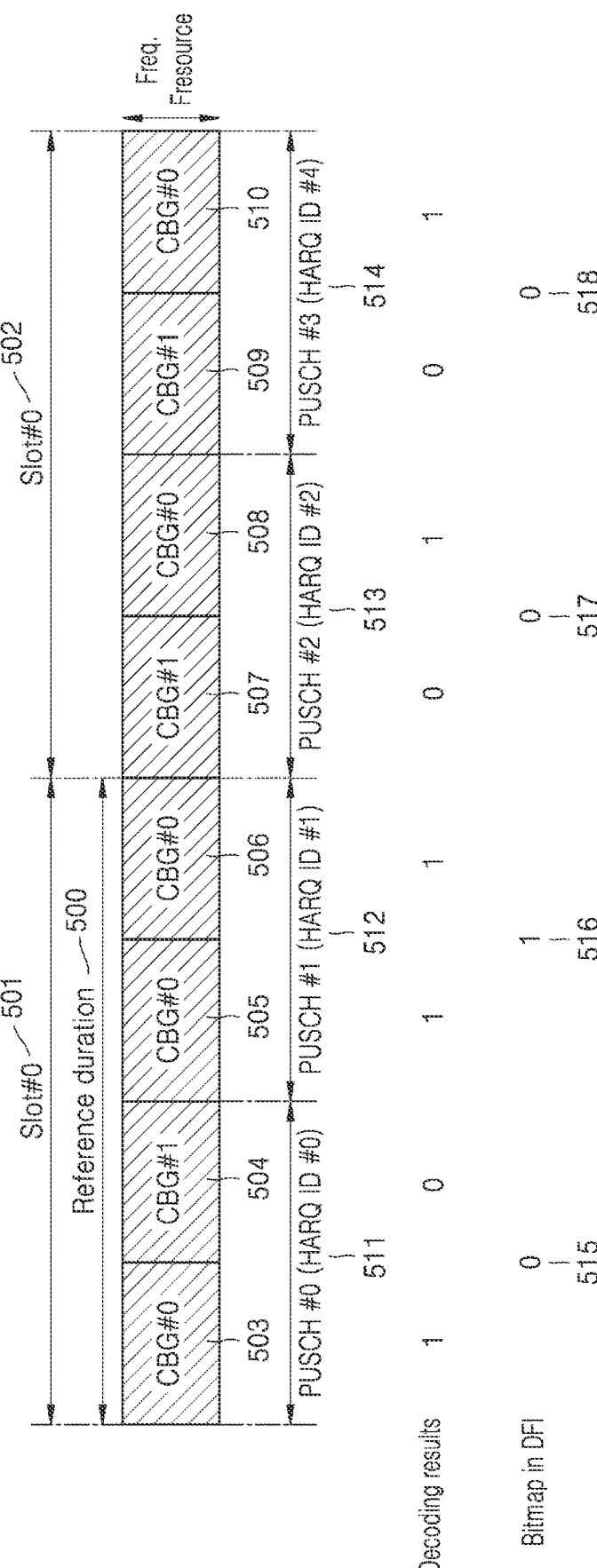
FIG. 5 is a diagram showing an embodiment of the disclosure.

FIG. 5 is a diagram showing an embodiment of the disclosure.

An operation of the embodiment will be described in detail with reference to FIG. 5. In FIG. 5, it is assumed that a base station configured a size of CBG to be 2 through higher layer signaling.

The base station may receive, from a terminal, a CBG-based uplink signal (PUSCH or TB). Also, the base station may decode the received CBG-based uplink signal in units of CBGs. The base station may reconfigure (or change) a decoding result of CBG when generating an HARQ-ACK information bit for the uplink signal (or an HARQ process number). For example, when it is determined that at least one CBG is NACK as a result of decoding one or more CBGs configuring an uplink signal 511 (TB or PUSCH) received from the terminal, the base station may configure a bitmap of CG-DFI by generating an HARQ-ACK information bit for the uplink signal 511 (or HARQ process number) to be NACK 515 (or 0 or 1). As another example, when it is determined that all CBGs are ACK as a result of decoding one or more CBGs configuring an uplink signal 512 (TB or PUSCH) received from the terminal, the base station may configure a bitmap of CG-DFI by generating an HARQ-ACK information bit for the uplink signal (or HARQ process number) to be NACK 516 (or 1 or 0).

Upon receiving the bitmap of CG-DFI configured as such, the terminal may adjust a contention window value by using bit information of the bitmap of CG-DFI. Hereinafter, a method by which the terminal determines bitmap information of CG-DFI to adjust the contention window value will be described.

Embodiment 1-1 TB Unit Information-Based Contention Window Value Adjustment

When determining the bitmap information included in the received DFI, the terminal may determine that each piece of bit information of the bitmap denotes TB-based ACK/NACK information. In detail, the terminal may adjust (or change or configure) the contention window value based on one or more pieces of bit information 515 and 516 for the one or more uplink signals 511 and 512 (PUSCH or TB) transmitted in a reference slot (or duration) 500, from among the bitmap information included in the received CG-DFI. For example, from among the pieces of feedback bit information 515 and 516 for the one or more uplink signals 511 and 512 (PUSCH or TB) transmitted in the reference slot (or duration) 500, when the feedback bit information for at least one of the uplink signals 511 and 512 (PUSCH or TB) is ACK 516 (or 0 or 1), the terminal may adjust (or change or configure) the contention window value to an initial value (or minimum value) or maintain a current contention window value. As another example, when the pieces of bit information for the one or more uplink signals 511 and 512 (PUSCH or TB) transmitted in the reference slot (or duration) 500 are all NACK (or 1 or 1), the terminal may increase the contention window value to a next contention window value. Also, when one or more uplink signals (TB or PUSCH) determined to be NACK in the bitmap of the received CG-DFI is configured grant transmission, the terminal may perform retransmission. Here, the terminal may not perform retransmission on a grant (or scheduling)-based uplink signal.

Embodiment 1-2 CBG Unit-Based Contention Window Value Adjustment

When determining the bitmap information included in the received CG-DFI, the terminal may determine that each bit of the bitmap denotes CBG-based ACK/NACK information. In detail, the terminal may determine adjustment (or change or configuration) of the contention window value by converting each of the one or more pieces of bit information 515 and 516 for the one or more uplink signals 511 and 512 (PUSCH or TB) transmitted in the reference slot (or duration) 500, from among the bitmap information included in the received CG-DFI, into CBG-based ACK/NACK information. For example, when the pieces of feedback bit information 515 and 516 received for the one or more uplink signals 511 and 512 (PUSCH or TB) transmitted in the reference slot (or duration) 500 are ACK and NACK, the terminal may determine "ACK ACK" and "NACK NACK", which are ACK/NACK in units of CBGs. Here, the terminal may adjust (or change or configure) the contention window value based on proportions of ACK and NACK in units of CBGs. When at least 10% of the CBG-based ACK/NACK information are ACK, the terminal may adjust (or change or configure) the contention window value to the initial value (or minimum value) or maintain the current contention window value. When at least 10% (or 10% or less) of the CBG-based ACK/NACK information are not ACK, the terminal may increase the contention window value to the next contention window value. Also, when one or more uplink signals (TB or PUSCH) determined to be NACK in the bitmap of the received CG-DFI is configured grant transmission, the terminal may perform retransmission on the uplink signal. Here, the terminal may not perform retransmission on a grant (or scheduling)-based uplink signal. According to Embodiment 1-2, there is a merit that a probability for minimizing the contention window value of the terminal may be increased.

According to the embodiments of the disclosure, the base station may configure operations according to the embodiments through L1 or higher layer signaling. Also, the contention window value may be adjusted in combination of the embodiments. For example, Embodiment 1-2 may be applied to determine an HARQ information bit for an uplink signal transmitted in a reference slot (or duration), and Embodiment 1-1 may be applied to determine HARQ information bits for other uplink signals.

Embodiment 2

In the present embodiment, a method by which a base station indicates ACK/NACK transmission information for all HARQ processes by using a bitmap and a method by which a terminal determines received ACK/NACK information will be described for the base station and terminal operating in an unlicensed band.

Regarding the base station and terminal transmitting/receiving a signal in the unlicensed band, the terminal configured to perform PUCCH/PUSCH transmission in one or more slots through a configured grant configuration is assumed. Also, the terminal may perform the PUCCH/PUSCH transmission in at least the one or more slots through the configured grant configuration from the base station. Upon receiving a configuration of configured grant transmission from the base station, the terminal may add an HARQ process number to an uplink control signal and transmit the same while transmitting a PUSCH. Here, the HARQ process number used for the configured grant transmission may be allocated by the base station, and may also be used for grant (scheduling)-based transmission. Meanwhile, the base station may configure the terminal with CBG-based uplink transmission. When decoding a CBG-based uplink signal, the base station may determine transmission success or failure while performing the decoding for each code block. Also, the base station may configure, through L1 or higher layer signaling (for example, SIB, MIC, MAC-CE, or RRC signaling), whether to operate a scheme for configuring a bitmap of DFI, based on a TB indicating HARQ-ACK feedback in 1 bit for each HARQ process or based on a CBG indicating HARQ-ACK feedback for one or more CBGs for each HARQ process.

Figure 6:
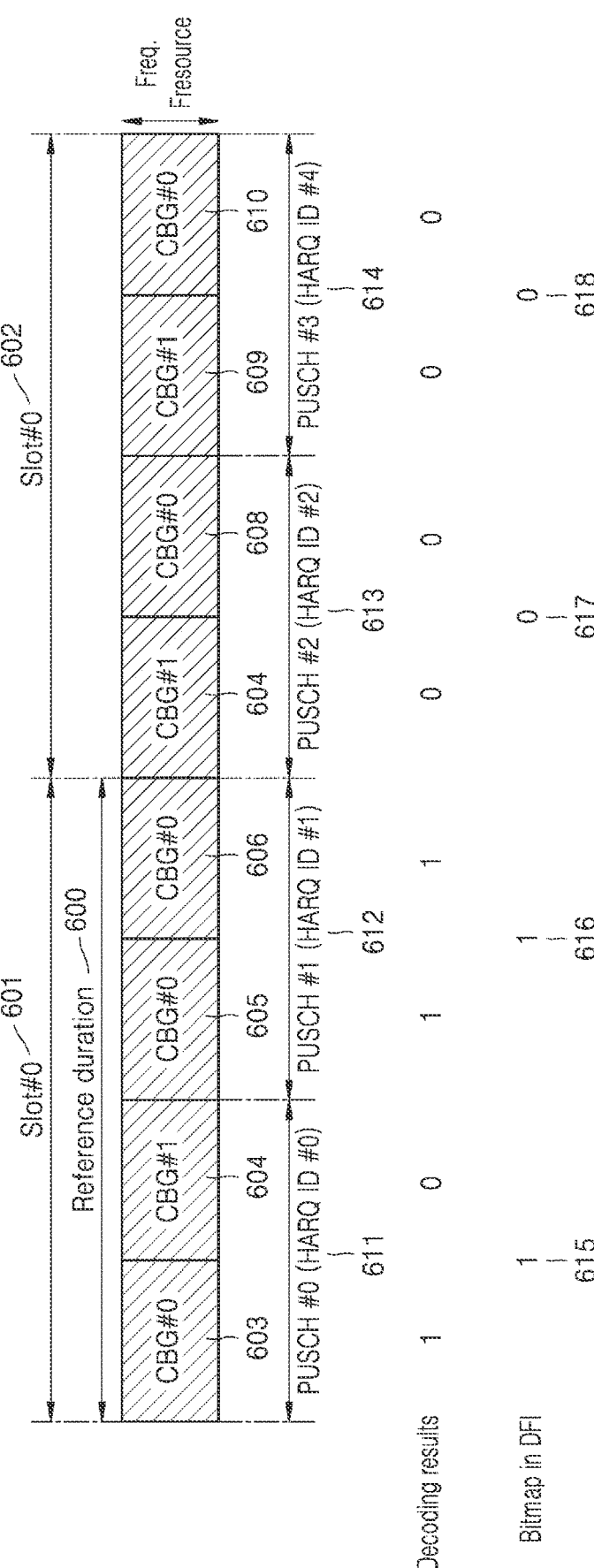
FIG. 6 is a diagram showing another embodiment of the disclosure.

FIG. 6 is a diagram showing another embodiment of the disclosure.

In FIG. 6, it is assumed that a base station configured a size of CBG to be 2 through higher layer signaling.

The base station may receive, from a terminal, a CBG-based uplink signal (PUSCH or TB). Also, the base station may decode the received CBG-based uplink signal in units of CBGs. The base station may determine a method of adjusting a contention window value of the terminal, based on a decoding result of CBG when generating an HARQ-ACK information bit for the uplink signal (or an HARQ process number). For example, as a result of decoding, by the base station, one or more CBGs configuring uplink signals 611 and 612 (TB or PUSCH) received in a reference slot (or duration) 600 from the terminal, when at least 10% of CBGs are determined to be ACK or one or more uplink signals (TB or PUSCH) are determined to be ACK, the base station may expect that the terminal adjusts (or changes or configures) the contention window value of the terminal to an initial value (or minimum value) or maintains a current contention window value.

As another example, as the result of decoding, by the base station, the one or more CBGs configuring the uplink signals 611 and 612 (TB or PUSCH) received in the reference slot (or duration) 600 from the terminal, when at least 10% of the CBGs are not determined to be ACK or all uplink signals (TB or PUSCH) are determined to be NACK, the base station may expect that the terminal increases the contention window value to a next contention window value. Here, the baes station may generate a feedback information bit for the uplink signal (or HARQ process number) considering a method by which the terminal adjusts the contention window value. For example, as the result of decoding, by the base station, the one or more uplink signals 611 and 612 received in the reference slot (or duration) 600, when a change in the contention window value of the terminal to the initial value (or minimum value) is to be indicated, the base station may generate HARQ-ACK information bits for the one or more uplink signals 611 and 612 received in the reference slot (or duration) 600 to be all ACK (or 1 or 0).

As another example, as the result of decoding, by the base station, the one or more uplink signals 611 and 612 received in the reference slot (or duration) 600, when an increase in the contention window value of the terminal is to be indicated, the base station may generate the HARQ-ACK information bits for the one or more uplink signals 611 and 612 received in the reference slot (or duration) 600 to be all NACK (or 0 or 1).

According to another embodiment, it is possible to indicate the method of adjusting the contention window value of the terminal by configuring a specific bit combination through L1 or higher layer signaling or by configuring a pre-set bit configuration. Here, a size of a specific bit may be equal to the number of uplink signals transmitted in a reference slot (or duration). The terminal may adjust contention window value of the terminal by using bit information corresponding to the reference slot (or duration) from among bits of the bitmap of the received CG-DFI. Here, the terminal may not perform retransmission based on the bit information corresponding to the reference slot (or duration) (or increase adjustment information of the contention window value of the terminal).

In the present embodiment, the method by which the base station generates the HARQ-ACK information bits for the uplink signals transmitted in the reference slot (or duration) has been described, but the method may be applied to all slots. Alternatively, the method may be applied only to grant-based uplink transmission or a configured grant-based uplink transmission signal.

Embodiment 3

In the present embodiment, a method of adjusting a contention window value based on UL grant DCI received by a terminal, in a base station and the terminal operating in an unlicensed band, will be described.

Regarding the base station and terminal transmitting/receiving a signal in the unlicensed band, the terminal configured to perform PUCCH/PUSCH transmission in one or more slots through a configured grant configuration is assumed. Also, the terminal may transmit a PUCCH/PUSCH in at least the one or more slots through the configured grant configuration from the base station. Upon receiving a configuration of configured grant transmission from the base station, the terminal may add an HARQ process number to an uplink control signal and transmit the same while transmitting a PUSCH. Here, the HARQ process number used for the configured grant transmission may be allocated by the base station, and may also be used for grant (scheduling)-based transmission. Meanwhile, the base station may configure the terminal with CBG-based uplink transmission. When decoding a CBG-based uplink signal, the base station may determine transmission success or failure while performing the decoding for each code block.

Figure 7:
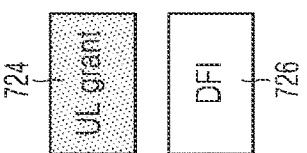
FIG. 7 is a diagram showing another embodiment of the disclosure.

FIG. 7 is a diagram showing another embodiment of the disclosure.

In FIG. 7, it is assumed that a base station configured a size of CBG to be 2 through higher layer signaling.

The base station may transmit, to a terminal, CG-DFI 707 by configuring, in a bitmap, feedback for an uplink signal of the terminal. The terminal may perform contention window value adjustment of the terminal, based on bitmap information of the CG-DFI received from the base station. Meanwhile, after transmitting the CG-DFI 707 to the terminal, the base station may transmit UL grant DCI 708 indicating uplink retransmission or initial transmission of the terminal, and the UL grant DCI may include ACK/NACK information in units of TBs or CBGs. Here, it is assumed that the terminal receives the UL grant DCI 708 from the base station after increasing a contention window value by using information included in the CG-DFI 707. Also, it is assumed that the UL grant DCI 708 received by the terminal includes ACK/NACK information for uplink transmission or an HARQ process used to adjust the contention window value of the terminal based on the bitmap information of the CG-DFI 707. When the ACK/NACK information (or contention window value adjustment information) received from the CG-DFI 707 and the ACK/NACK information received from the UL grant DCI 708 are the same, the terminal may not change the contention window value of the terminal determined based on the CG-DFI 707. When the ACK/NACK information (or contention window value adjustment information) received from the CG-DFI 707 and the ACK/NACK information received from the UL grant DCI 708 are different from each other, the terminal may adjust the contention window value of the terminal as follows.

Embodiment 3-1

The terminal may maintain the contention window value adjusted by using the information included in the pre-received CG-DFI 707. In other words, the ACK/NACK information included in the UL grant DCI 708 may not be used to adjust the contention window value of the terminal.

Embodiment 3-2

The terminal may change the contention window value adjusted by using the information included in the pre-received CG-DFI 707, based on the ACK/NACK information included in the UL grant DCI 708. For example, the terminal may increase the contention window value by using the information included in the CG-DFI 707, and then adjust the contention window value of the terminal to the initial value (or minimum value) when the ACK/NACK information included in the UL grant DCI 708 received by the terminal indicates to adjust the contention window value of the terminal to the initial value (or minimum value). As another example, the terminal may adjust the contention window value to the initial value (or minimum value) by using the information included in the CG-DFI 707, and then increase the contention window value of the terminal when the ACK/NACK information included in the UL grant DCI 708 received by the terminal indicates an increase in the contention window value of the terminal. Here, the terminal may increase the contention window value based on the contention window value before the reception of the CG-DFI 707, or based on the contention window value adjusted to the initial value (or minimum value) after the reception of the CG-DFI 707. As another example, the terminal may increase the contention window value by using the information included in the CG-DFI 707, and then increase the contention window value of the terminal to a next value when the ACK/NACK information included in the UL grant DCI received by the terminal indicates to increase the contention window value of the terminal.

Embodiment 3-3

When the terminal is to change the contention window value adjusted by using information included in pre-received CG-DFI 716, based on ACK/NACK information included in UL grant DCI 724, the ACK/NACK information included in the UL grant DCI may not be used to adjust the contention window value of the terminal in a case where another reference slot (or duration) 717 is configured before reception of UL grant DCI 724 or in a case where another uplink signal is transmitted after reception of CG-DFI 716.

Embodiment 3-4

The terminal may adjust the contention window value based on UL grant DCI 725 in a case where the terminal has received an indication of retransmission (or CBG-based retransmission) for one or more uplink signals 714 and 715 transmitted in a reference slot (or duration) 709 or initial transmission for a corresponding HARQ process, through the UL grant DCI 725 before reception of CG-DFI 726. Here, ACK/NACK information (or contention window adjustment information) received from the DFI may not be used or may not be expected to be received.

Embodiment 4

In the present embodiment, regarding a base station and terminal transmitting/receiving a signal in an unlicensed band, the terminal configured to perform PUSCH transmission in one or more slots (or symbols) through a configured grant configuration is assumed. Upon receiving a configuration of configured grant transmission from the base station, the terminal may add an HARQ process number to an uplink control signal and transmit the same while transmitting a PUSCH. Here, the HARQ process number used for the configured grant transmission may be allocated by the base station, and may also be used for grant (scheduling)-based transmission. Meanwhile, the base station may configure, through higher layer (or L1 or DCI) signaling, the terminal to transmit an uplink signal based on CBG. When decoding a TB of an uplink signal received from the terminal, the base station may determine transmission success or failure while performing the decoding for each code block. Here, the terminal may determine that CBG-based uplink signal transmission configured through the higher layer (or L1) signaling from the base station corresponds only to uplink signal transmission scheduled by DCI. In other words, the terminal may not perform the CBG-based uplink signal transmission during configured grant-based uplink transmission of the unlicensed band. According to another embodiment, in the unlicensed band, the base station may not configure the terminal with the CBG-based uplink signal transmission through the higher layer (or L1) signaling. In other words, the terminal may not expect the base station to configure the CBG-based uplink signal transmission, in the unlicensed band.

Meanwhile, when the base station has configured the terminal to transmit an uplink signal based on CBG through higher layer (or L1 or DCI) signaling, the terminal may not perform configured grant uplink (or scheduled uplink) transmission based on bit information of DFI. The terminal may use the bit information of DFI only to adjust a contention window value of the terminal. For example, only the contention window value may be increased without performing retransmission, even when DFI feedback for a specific HARQ process number indicates NACK.

Figure 8:
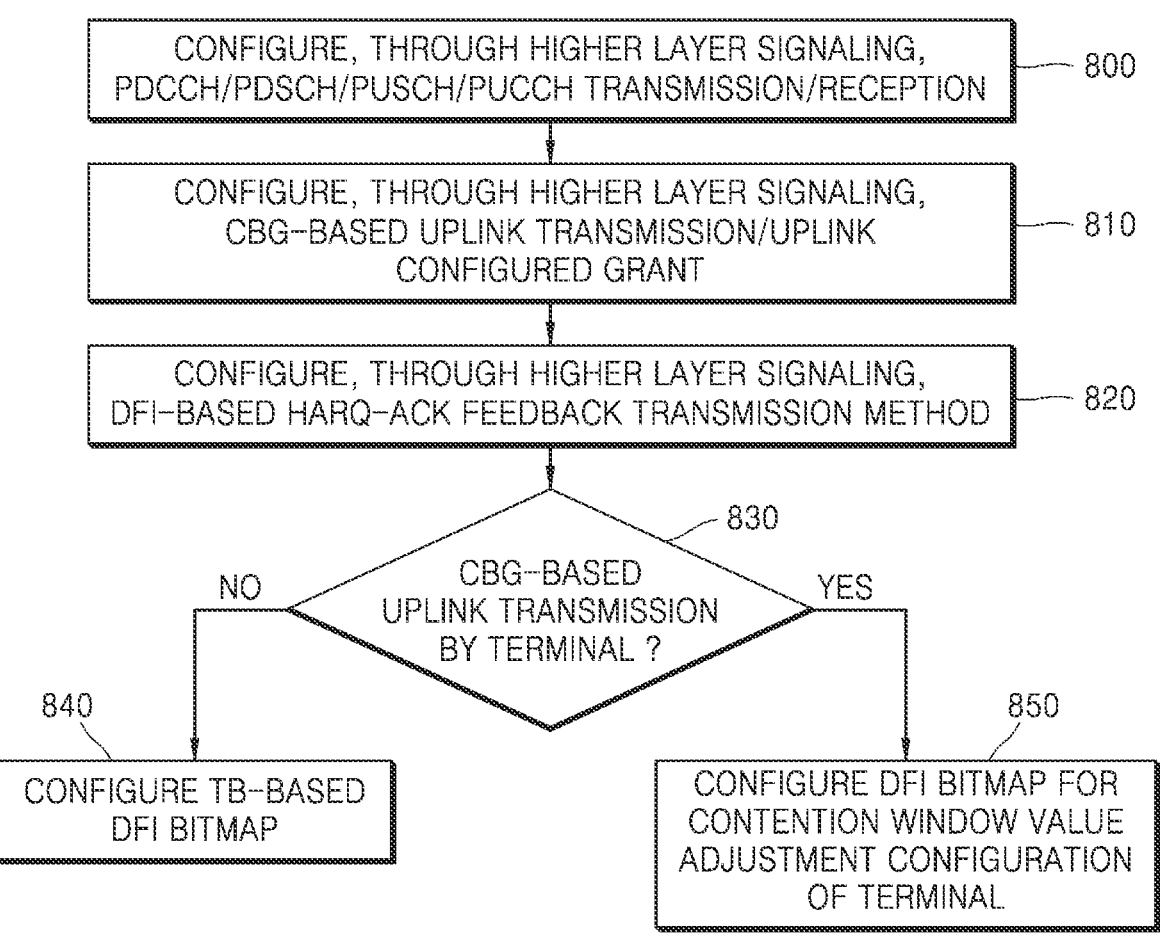
FIG. 8 is a flowchart illustrating operations of a base station, according to an embodiment of the disclosure.

FIG. 8 is a flowchart illustrating operations of a base station, according to an embodiment of the disclosure.

The operations of the base station will now be described with reference to FIG. 8. In operation 800, the base station may transmit a configuration for PDCCH, PDSCH, PUCCH, and PUSCH transmission/reception to a terminal through higher layer signaling. For example, the base station may transmit a PDCCH resource region for receiving downlink or uplink scheduling information, a CORESET configuration, or a search space configuration to the terminal through higher layer signaling. Also, the base station may transmit a configuration for PDSCH/PUSCH transmission/reception including offset information between a PDCCH reception slot and a PDSCH reception slot or a PUSCH transmission slot, and information on the number of times a PDSCH or a PUSCH is repeatedly transmitted, to the terminal through higher layer signaling. Also, the base station may transmit, to the terminal through higher layer signaling, configuration information for scheduling multiple PUSCHs through one piece of DCI, an interlace structure configuration, and a configuration about subcarrier spacing information used during downlink reception or uplink transmission. In operation 810, the base station may additionally transmit configured grant-related configuration information, such as a configured grant transmission cycle and offset information. Also, configuration information related to a CBG size or the like for CBG-based uplink transmission may be transmitted. Here, the configured grant configuration information and CBG-based uplink configuration information transmitted to the terminal in operation 810 may alternatively transmitted in operation 800. In operation 820, the base station may additionally configure configuration information regarding a method of configuring a bitmap of DFI, and when related configuration information is pre-configured, operation 820 may be omitted. When the terminal does not transmit an uplink signal based on CBG in operation 830, the base station may configure a bitmap of DFI based on TB-based ACK/NACK information in operation 840. When the terminal transmits the uplink signal based on CBG in operation 830, the base station may configure a DFI bitmap for contention window value adjustment configuration of the terminal, based on the method of configuring the DFI bitmap configured to the terminal in operation 820, and transmit the same to the terminal in operation 850.

Figure 9:
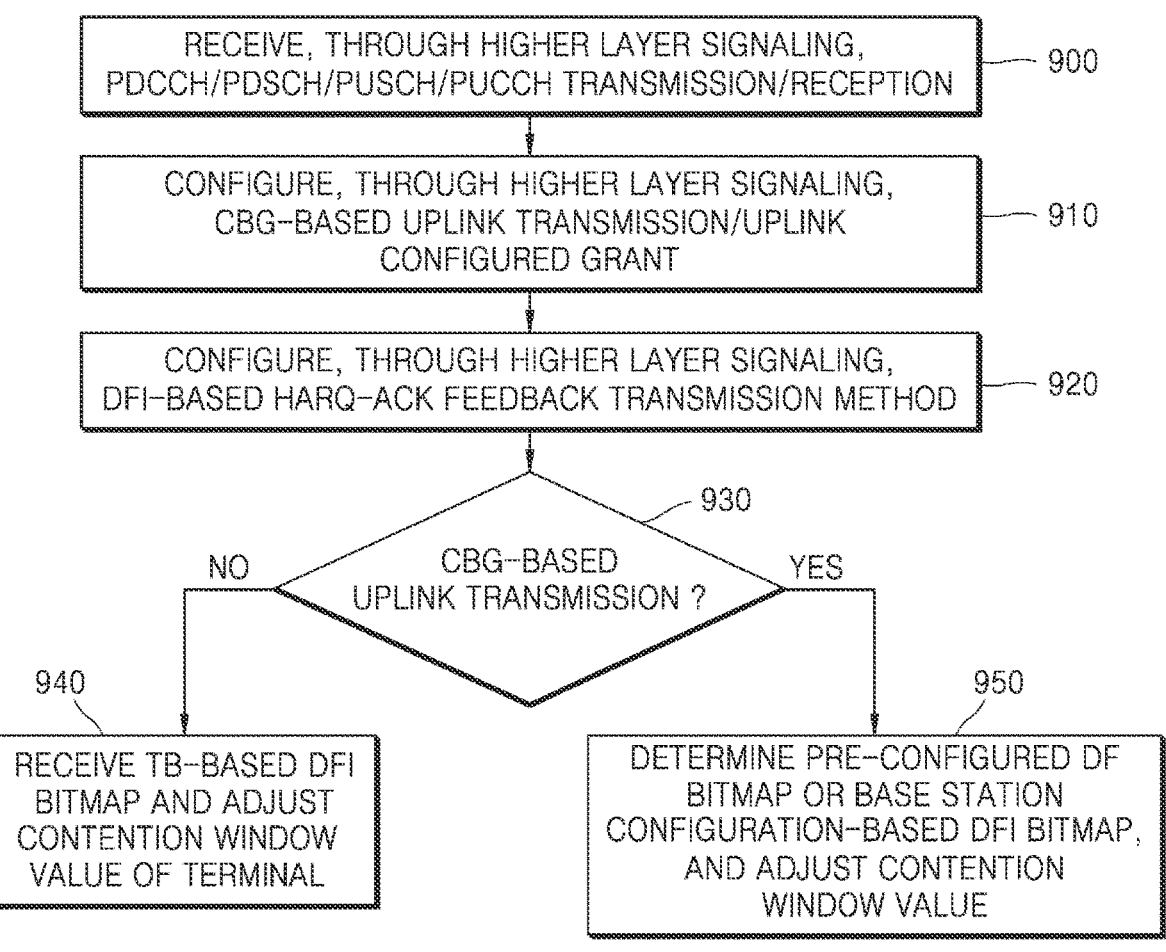
FIG. 9 is a flowchart illustrating operations of a terminal, according to an embodiment of the disclosure.

FIG. 9 is a flowchart illustrating operations of a terminal, according to an embodiment of the disclosure.

In operation 900, the terminal receives, from a base station, a configuration for PDCCH, PDSCH, PUCCH, and PUSCH transmission/reception through higher layer signaling, and configures PDCCH, PDSCH, PUCCH, and PUSCH transmission/reception according to received configuration information. For example, the terminal may receive a PDCCH resource region for receiving downlink or uplink scheduling information from the base station, a CORESET configuration, or a search space configuration through higher layer signaling. Also, the terminal may be configured with, by the base station through higher layer signaling, configuration information for scheduling multiple PUSCHs through one piece of DCI, an interlace structure configuration, and a configuration about subcarrier spacing information used during downlink reception or uplink transmission. In operation 910, the terminal may be additionally configured with configured grant-related configuration information, such as a configured grant transmission cycle and offset information. Also, the terminal may be additionally configured with configuration information related to a CBG size or the like for CBG-based uplink transmission. Here, the configured grant-related configuration information and CBG-based uplink configuration information of operation 910 may be alternatively included in the higher layer signal configuration information transmitted in operation 900. In operation 920, the terminal may be configured with configuration information regarding a method by which the base station configures a bitmap of DFI, and when related configuration information is pre-configured, operation 920 may be omitted. When the terminal does not transmit an uplink signal based on CBG in operation 930, the terminal may determine that a DFI bitmap received from the base station denotes ACK/NACK in units of TBs, in operation 940. When the terminal transmits the uplink signal based on CBG in operation 930, the terminal may determine the DFI bitmap received from the base station in operation 950, based on the method of determining the DFI bitmap configured in operation 920 or a pre-configured method, and adjust a contention window value of the terminal.

According to an embodiment of the disclosure, a wireless communication system, in particular, a system and node for transmitting/receiving a signal based on CBG transmission information through an unlicensed band, generate feedback bit information for a received signal according to a purpose of feedback to be transmitted, and thus may further efficiently transmit/receive HARQ-ACK feedback.

Figure 10:
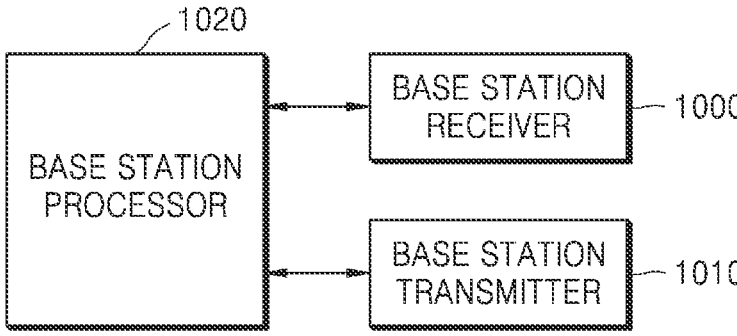
FIG. 10 is a block diagram illustrating a structure of a base station, according to an embodiment of the disclosure.

FIG. 10 is a block diagram illustrating a structure of a base station, according to an embodiment of the disclosure.

Referring to FIG. 10, the base station according to an embodiment of the disclosure may include a base station receiver 1000, a base station transmitter 1010, and a base station processor 1020. The base station receiver 1000 and the base station transmitter 1010 may be collectively referred to as a transceiver in an embodiment of the disclosure. The transceiver may transmit or receive a signal to or from a terminal. The signals may include control information and data. In this regard, the transceiver may include an RF transmitter for up-converting and amplifying a frequency of a transmitted signal, and a RF receiver for amplifying low-noise and down-converting a frequency of a received signal. Also, the transceiver may receive and output, to the base station processor 1020, a signal through a wireless channel, and transmit a signal output from the base station processor 1020 through the wireless channel. The base station processor 1020 may control a series of processes such that the base station operates according to an embodiment of the disclosure described above. For example, the base station receiver 1000 may receive a data signal including a control signal transmitted by the terminal, and the base station processor 1020 may determine a reception result for the data signal and the control signal transmitted by the terminal. As another example, the base station processor 1020 may perform a channel access procedure on an unlicensed band. In detail, for example, the base station receiver 1000 may receive signals transmitted through the unlicensed band, and the base station processor 1020 may determine whether the unlicensed band is in an idle state by comparing an intensity of the received signal with a threshold value that is predefined or is determined from a value of a function having a bandwidth as a factor. As another example, the base station processor 1020 may configure or change DCI for the base station to indicate release or activation of Type 2 CG-PUSCH scheduling. As another example, when the base station receiver 1000 receives, from the terminal, information about a downlink transmission interval in a channel occupancy interval of an unlicensed band, the base station processor 1020 may reconfigure or change downlink control and data channel transmission time or cycle of the base station, and accordingly, the base station transmitter 1010 may transmit a downlink control and data channel. Also, the base station processor 1020 may generate a bitmap of DFI based on a result of receiving, by the base station receiver 1000, a data signal of the terminal. Here, the base station transmitter 1010 may transmit, to the terminal, the DFI generated by the base station processor 1020.

Figure 11:
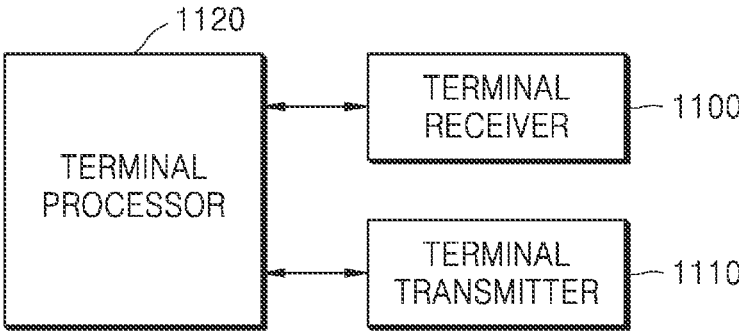
FIG. 11 is a block diagram illustrating a structure of a terminal, according to an embodiment of the disclosure.

FIG. 11 is a block diagram illustrating a structure of a terminal, according to an embodiment of the disclosure.

Referring to FIG. 11, the terminal according to an embodiment of the disclosure may include a terminal receiver 1100, a terminal transmitter 1110, and a terminal processor 1120. The terminal receiver 1100 and the terminal transmitter 1110 may be collectively referred to as a transceiver in an embodiment of the disclosure. The transceiver may transmit or receive a signal to or from a base station. The signals may include control information and data. In this regard, the transceiver may include an RF transmitter for up-converting and amplifying a frequency of a transmitted signal, and a RF receiver for amplifying low-noise and down-converting a frequency of a received signal. Also, the transceiver may receive and output, to the terminal processor 1120, a signal through a wireless channel, and transmit a signal output from the terminal processor 1120 through the wireless channel. The terminal processor 1120 may control a series of processes such that the terminal operates according to an embodiment of the disclosure described above. For example, the terminal receiver 1100 may receive a data signal including a control signal, and the terminal processor 1120 may determine a reception result for the data signal. Next, when a first signal reception result including data reception at a timing needs to be transmitted to the base station, the terminal transmitter 1110 may transmit the first signal reception signal to the base station at a timing determined by the processor. As another example, when the terminal receiver 1100 receives, from the base station, information on an uplink or downlink transmission interval within a channel occupancy interval of an unlicensed band, the terminal processor 1120 may reconfigure or change a downlink control channel transmission time or period of the terminal, or the terminal may reconfigure or change time domain allocation information of a scheduled uplink data channel, and accordingly, the terminal receiver 1100 may receive a downlink control channel transmitted by the base station. Also, the terminal may receive, from the base station, a reception result for uplink data transmitted by the terminal receiver 1100, and the terminal processor 1120 may maintain or change a size of a contention window used in a channel access procedure for unlicensed band signal transmission according to the received result. Also, the terminal receiver 1100 receives DFI and information related to DFI, which are transmitted by the base station, and the terminal processor 1120 determines a bitmap of DFI based on received DFI determination information or pre-configured DFI determination information. Also, the terminal processor 1120 may adjust a contention window value of the terminal, based on the determined bitmap information of DFI.

Methods according to the claims of the disclosure or the embodiments described in the specification may be implemented in hardware, software, or a combination of hardware and software.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims and the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access an apparatus that performs embodiments of the disclosure.

In the afore-described embodiments of the disclosure, elements included in the disclosure are expressed in a singular or plural form according to specific embodiments. However, the singular or plural form is selected appropriately for a situation assumed for convenience of descriptions, the disclosure is not limited to the singular or plural form, and an element expressed in a singular form may include a plurality of elements and elements expressed in a plural form may include a single element.

The embodiments of the disclosure described herein are merely to easily describe technical content of the disclosure and to promote understanding of the disclosure, and do not limit the scope of the disclosure. That is, it will be obvious to one of ordinary skill in the art to which the disclosure belongs that different modifications may be achieved based on the technical spirit of the disclosure. Also, the embodiments may be combined with each other as required. For example, a portion of one embodiment of the disclosure and a portion of another embodiment of the disclosure may be combined with each other to enable a base station and a terminal to operate. Also, other modifications based on technical ideas of the embodiments may be implemented on various systems, such as a FDD LTE system, a TDD LTE system, a 5G or NR system, and the like.

The invention claimed is:

1. A method performed by a terminal in a wireless communication system, the method comprising:
    receiving, from a base station, downlink control information (DCI) including configured grant-downlink feedback information (CG-DFI) including hybrid automatic repeat request-acknowledgement (HARQ-ACK) feedback for at least one first physical uplink shared channel (PUSCH);
    identifying the HARQ-ACK feedback for the at least one first PUSCH, based on the HARQ-ACK feedback included in the CG-DFI, wherein the at least one first PUSCH is associated with a code block group (CBG) based PUSCH and a contention window value, and wherein the HARQ-ACK feedback corresponds to at least one PUSCH in a reference duration;
    if at least 10% of the HARQ-ACK feedback is ACK, adjusting the contention window value to a minimum value associated with a channel access priority class; and
    if not at least 10% of the HARQ-ACK feedback is ACK, adjusting the contention window value from a current value associated with the channel access priority class to a next higher value associated with the channel access priority class.

2. The method of claim 1, further comprising:
    performing PUSCH transmission, based on the contention window value.

3. The method of claim 1, wherein the channel access priority class is associated with allowed contention window values.

4. A method performed by a base station in a wireless communication system, the method comprising:
    determining configured grant-downlink feedback information (CG-DFI); and
    transmitting, to a terminal, downlink control information, DCI, including the CG-DFI including hybrid automatic repeat request-acknowledgement (HARQ-ACK) feedback for at least one first physical uplink shared channel (PUSCH),
    wherein the HARQ-ACK feedback for the at least one first PUSCH is included in the CG-DFI, wherein the at least one PUSCH is associated with a code block group (CBG) based PUSCH and a contention window value, wherein the HARQ-ACK feedback corresponds to the at least one PUSCH in a reference duration,
    wherein if at least 10% of the HARQ-ACK feedback is ACK, the contention window value is a minimum value associated with a channel access priority class, and
    wherein if not at least 10% of the HARQ-ACK feedback is ACK, the contention window value is adjusted from a current value associated with the channel access priority class to a next higher value associated with the channel access priority class.

5. The method of claim 4, further comprising:

receiving, from the terminal via the at least one first PUSCH, uplink data, based on the contention window value.

6. The method of claim 4, wherein the channel access priority class is associated with allowed contention window values.

7. A terminal in a wireless communication system, the terminal comprising:

a transceiver; and at least one processor configured to:

receive, from a base station, downlink control information, DCI, including configured grant-downlink feedback information, CG-DFI, including hybrid automatic repeat request-acknowledgement (HARQ-ACK) feedback for at least one first physical uplink shared channel (PUSCH), identify the HARQ-ACK feedback for the at least one first PUSCH, based on the HARQ-ACK feedback included in the CG-DFI, wherein the at least one PUSCH is associated with a code block group (CBG) based PUSCH and a contention window value, and wherein the HARQ-ACK feedback corresponds to the at least one first PUSCH in a reference duration, if at least 10% of the HARQ-ACK feedback is ACK, adjust the contention window value to a minimum value associated with a channel access priority class, and if not at least 10% of the HARQ-ACK feedback is ACK, adjust the contention window value from a current value associated with the channel access priority class to a next higher value associated with the channel access priority class.

8. A base station in a wireless communication system, the base station comprising:

a transceiver; and at least one processor configured to:

determine configured grant-downlink feedback information (CG-DFI), and transmit, to a terminal via the transceiver, downlink control information, DCI, including the CG-DFI including hybrid automatic repeat request-acknowledgement (HARQ-ACK) feedback for at least one first physical uplink shared channel (PUSCH), wherein the HARQ-ACK feedback for the at least one first PUSCH is included in the CG-DFI, wherein the at least one PUSCH is associated with a code block group (CBG) based PUSCH and a contention window value, wherein the HARQ-ACK feedback corresponds to the at least one first PUSCH in a reference duration, wherein if at least 10% of the HARQ-ACK feedback is ACK, the contention window value is a minimum value associated with a channel access priority class, and wherein if not at least 10% of the HARQ-ACK feedback is ACK, the contention window value is adjusted from a current value associated with the channel access priority class to a next higher value configured for the channel access priority class.

* * * * *